US009289345B2

(12) United States Patent
Yasuhara

(10) Patent No.: US 9,289,345 B2
(45) Date of Patent: Mar. 22, 2016

(54) WALKING ASSIST DEVICE

(71) Applicant: HONDA MOTOR CO., LTD., Tokyo (JP)

(72) Inventor: Ken Yasuhara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 694 days.

(21) Appl. No.: 13/686,109

(22) Filed: Nov. 27, 2012

(65) Prior Publication Data
US 2013/0138020 A1 May 30, 2013

(30) Foreign Application Priority Data

Nov. 30, 2011 (JP) .................................. 2011-263045

(51) Int. Cl.
*A61H 1/00* (2006.01)
*A61H 3/00* (2006.01)
*A61H 1/02* (2006.01)

(52) U.S. Cl.
CPC ................ *A61H 3/00* (2013.01); *A61H 1/0244* (2013.01); *A61H 2201/1207* (2013.01); *A61H 2201/163* (2013.01); *A61H 2201/165* (2013.01); *A61H 2201/1642* (2013.01); *A61H 2201/1676* (2013.01); *A61H 2201/5007* (2013.01); *A61H 2201/5069* (2013.01); *A61H 2201/5092* (2013.01); *G05B 2219/45108* (2013.01)

(58) Field of Classification Search
CPC ... A61H 1/024; A61H 1/0244; A61H 1/0255; A61H 1/0262; A61H 3/00; A61H 3/008; A61H 2003/007; A61B 5/112
See application file for complete search history.

(56) References Cited

U.S. PATENT DOCUMENTS 7,942,833 B2 * 5/2011 Yasuhara ................. A61H 3/00
  135/67
8,292,836 B2 * 10/2012 Matsuoka .............. A61H 3/008
  601/34

(Continued)

FOREIGN PATENT DOCUMENTS

JP   2004-073649   3/2004
JP      3930399    3/2007

OTHER PUBLICATIONS

A proposal of a motor adaptation mechanism with phase oscillators and trajectory generator, Shunsuke Iida et al., Interdisciplinary Graduate School of Science and Engineering, Tokyo Institute of Technology, Discussed on p. 1 of specification, English abstract included, no date available.

*Primary Examiner* — Valerie L Skorupa
(74) *Attorney, Agent, or Firm* — Rankin, Hill & Clark LLP

(57) ABSTRACT

A walking assist device is capable of operating at an appropriate cycle in view of the motion cycle of a human being to be assisted while at the same time reducing the number of control parameters to be adjusted or set. A second phase oscillator, based on which the phase of the periodic operation of each actuator is controlled, is calculated on the basis of the difference between a first phase oscillator, which indicates a phase of the periodic motion of each thigh relative to the upper body of a human being, and the second phase oscillator, and an intrinsic angular velocity. A current intrinsic angular velocity is set by correcting a previous intrinsic angular velocity by an amount based on a previous difference between the first phase oscillator and the second phase oscillator such that the previous difference approaches a desired difference.

15 Claims, 14 Drawing Sheets

(56) References Cited

U.S. PATENT DOCUMENTS

| | | | | |
|---|---|---|---|---|
| 2005/0177080 A1* | 8/2005 | Yasuhara | ............... | A61B 5/112 602/16 |
| 2009/0062884 A1* | 3/2009 | Endo | .................... | A61N 1/0452 607/49 |
| 2010/0049102 A1* | 2/2010 | Yasuhara | ............. | A61H 1/0244 601/5 |
| 2010/0049333 A1* | 2/2010 | Endo | ........................ | A61H 3/00 623/27 |
| 2010/0132464 A1* | 6/2010 | Yasuhara | ............. | A61B 5/1038 73/504.12 |
| 2012/0071797 A1* | 3/2012 | Aoki | ....................... | A61H 1/024 601/34 |
| 2012/0101415 A1* | 4/2012 | Goffer | .................... | A61H 3/00 601/35 |

* cited by examiner $\delta\phi_0(0.0)$ $\xi_{L+}$: -0.6 $\xi_{L-}$: -0.6
$\xi_{R+}$: 0.0 $\xi_{R-}$: 0.0 @ RIGHT ANKLE 3kg $\delta\phi_0(0.0)$ $\xi_{L+}$: -0.6 $\xi_{L-}$: -0.6
$\xi_{R+}$: 0.0 $\xi_{R-}$: 0.0 @ RIGHT ANKLE 3kg

WALKING ASSIST DEVICE

BACKGROUND OF THE INVENTION

1. Field of the Invention

The present invention relates to a device adapted to assist a human periodic motion.

2. Description of the Related Art

There has been proposed a technical approach for assisting the periodic motion of a human being by effecting the coordination between a human motion cycle and the operation cycle of a device configured to transmit a force to the human being (refer to Japanese Patent Publication No. 3930399 (Patent Document 1)).

One possible method for reducing the number of parameters to be adjusted or set is to use a phase as a central pattern generator (CPG) model (refer to "Proposal of a motor adaptation mechanism with phase oscillators and trajectory generator" by IIDA, KONDO and ITO at SICE Symposium on Decentralized Autonomous Systems 18, 271-276, 2006. 01.26 (Non-patent Document 1)).

However, oversimplifying a model leads to a higher possibility of the operation cycle of a device becoming inappropriate in the aspect of the coordination with a human motion cycle.

SUMMARY OF THE INVENTION

Accordingly, an object of the present invention is to provide a device capable of operating at an appropriate cycle in view of the motion cycle of a human being to be assisted while at the same time reducing the number of control parameters to be adjusted or set.

The present invention relates to a walking assist device including: a first attachment adapted to be installed to the upper body of a human being; a pair of second attachments adapted to be installed, one to a right leg and the other to a left leg of the human being; a pair of actuators; a pair of joint angle sensors configured to output a signal based on each of the right and left hip joint angles of the human being; and a controller configured to control the operation of each of the pair of actuators on the basis of at least output signals of the pair of joint angle sensors, wherein each of the pair of the second attachments is moved with respect to the first attachment by an operation of each of the pair of actuators, thereby assisting relative periodic motions of the right and left legs with respect to the upper body.

In the walking assist device in accordance with the present invention for solving the aforesaid problem, the controller includes: a first phase oscillator output element configured to measure a phase of a period motion of each thigh relative to the upper body of the human being as right and left components of a first phase oscillator on the basis of an output of each of the pair of joint angle sensors; a second phase oscillator output element configured to calculate, as a second phase oscillator, a phase having right and left components that change at velocities based on a difference relative to the right and left components of the first phase oscillator and the right and left components of an intrinsic angular velocity; an intrinsic angular velocity setting element configured to set the right and left components of a current intrinsic angular velocity by correcting the right and left components of a previous intrinsic angular velocity by an amount based on a previous difference between each of the right and left components of the first phase oscillator and each of the right and left components of the second phase oscillator such that the previous difference approaches a desired difference; and a control signal generating element configured to generate a control signal that changes the phase of the periodic operation of each of the pair of actuators according to a change in each of the right and left components of the second phase oscillator.

The walking assist device according to the present invention sets the value of an intrinsic angular velocity such that the phase of the periodic operation of the walking assist device can be properly controlled in view of the phase of the periodic motion of a human being while at the same time simplifying the control mode thereof by reducing the number of control parameters.

To be specific, when calculating the second phase oscillator, which provides the basis for controlling the phase of the periodic operation of each of the actuators, the difference between the first phase oscillator and the second phase oscillator, which are the phases of the periodic motions of each thighs relative to the upper body of the human being, and the intrinsic angular velocity provide the bases. The number of parameters can be reduced under a relatively gentle condition that insofar as at least each component of the difference and each component of the intrinsic angular velocity are included in the control parameters to be adjusted or set, other parameters may be omitted.

Meanwhile, the current intrinsic angular velocity is set by correcting the previous intrinsic angular velocity by the amount based on the previous difference such that the previous difference between the first phase oscillator and the second phase oscillator approaches a desired difference. This makes it possible to operate each actuator at an appropriate cycle in relation to the motion cycle of a human being to be assisted and to periodically move the second attachments in relation to the first attachment.

The control signal generating element may be configured to generate a control signal that defines the operational amplitude of each of the pair of actuators on the basis of the ratio of a desired stride length to the length of a leg of the human being according to an increasing function using the ratio as the variable thereof.

The control signal generating element may be configured to calculate a mean stride length over a plurality of past cycles of the human being on the basis of the length of a leg of the human being and a waveform signal that indicates the temporal change of each hip joint angle obtained from the pair of joint angle sensors and then generate a control signal that defines the operational amplitude of each of the pair of actuators such that the difference between the mean stride length and the desired stride length of the human being decreases.

The walking assist device having the configuration described above is capable of controlling the amplitude of the periodic operation of the each actuator, i.e., the magnitude of the longitudinal displacement amount of each of the second attachments relative to the first attachment, according to the magnitude of the desired stride length of the human being. This arrangement allows the walking motion of the human being to be assisted such that the stride length of the human being approaches the desired stride length.

The second phase oscillator output element may be configured to calculate a first component, which is not distinguished according to whether each leg is bending or stretching, as each of the right and left components of the second phase oscillator used to set the intrinsic angular velocity by the intrinsic angular velocity setting element and each of the right and left components of the second phase oscillator used to generate the control signal by the control signal generating element.

The second phase oscillator output element may be configured to solve a simultaneous differential equation, which includes the term of correlation between each of the right and left components of the second phase oscillator as the first component and each of the right and left components of the first phase oscillator and the correlation term of each of the right and left components of the second phase oscillator as the first component, thereby to calculate the first component.

According to the walking assist device having the configuration described above, the parameters except for the coefficient of the correlation between the first phase oscillator and the second phase oscillator, the coefficient of the correlation between the components of the second phase oscillator, and the intrinsic angular velocity can be excluded from the parameters to be set or adjusted, thus allowing the number of the parameters to be reduced. Meanwhile, the intrinsic angular velocity being set as described above, it is possible to operate the walking assist device at a proper cycle for the motion cycle of the human being to be assisted.

The second phase oscillator output element may be configured to calculate a first component that is not distinguished according to whether each leg is bending or stretching as each of the right and left components of the second phase oscillator used to set the intrinsic angular velocity by the intrinsic angular velocity setting element and to calculate a second component that is distinguished according to whether each leg is bending or stretching as each of the right and left components of the second phase oscillator used to generate the control signal by the control signal generating element.

The second phase oscillator output element may be configured to solve a simultaneous differential equation, which includes a correlation term between each of the right and left components of the second phase oscillator as the first component and each of the right and left components of the first phase oscillator and the correlation term of each of the right and left components of the second phase oscillator as the first component thereby to calculate the first component, and to solve the differential equation of each component corresponding to the second component, which includes the term of correlation between each of the left bending component and the left stretching component of the second phase oscillator as the second component and the left component of the first phase oscillator, or the term of correlation between the right bending component and the right stretching component of the second phase oscillator as the second component and the right component of the first phase oscillator, thereby calculating the second component.

According to the walking assist device having the configuration described above, the parameters except for the coefficient of the correlation between the first phase oscillator and the first component of the second phase oscillator, the coefficient of the correlation between the first components of the second phase oscillator, the coefficient of the correlation between the first phase oscillator and the second component of the second phase oscillator, and the intrinsic angular velocity can be excluded from the parameters to be set or adjusted, thus allowing the number of the parameters to be reduced. Meanwhile, the intrinsic angular velocity being set as described above, it is possible to operate the walking assist device at a proper cycle for the motion cycle of the human being to be assisted.

The first phase oscillator output element is preferably configured to measure, on the basis of the output of each of the pair of joint angle sensors, the arctangent function of the ratio of each hip joint angular velocity with respect to each hip joint angle as each of the right and left components of the first phase oscillator.

Figure 1:
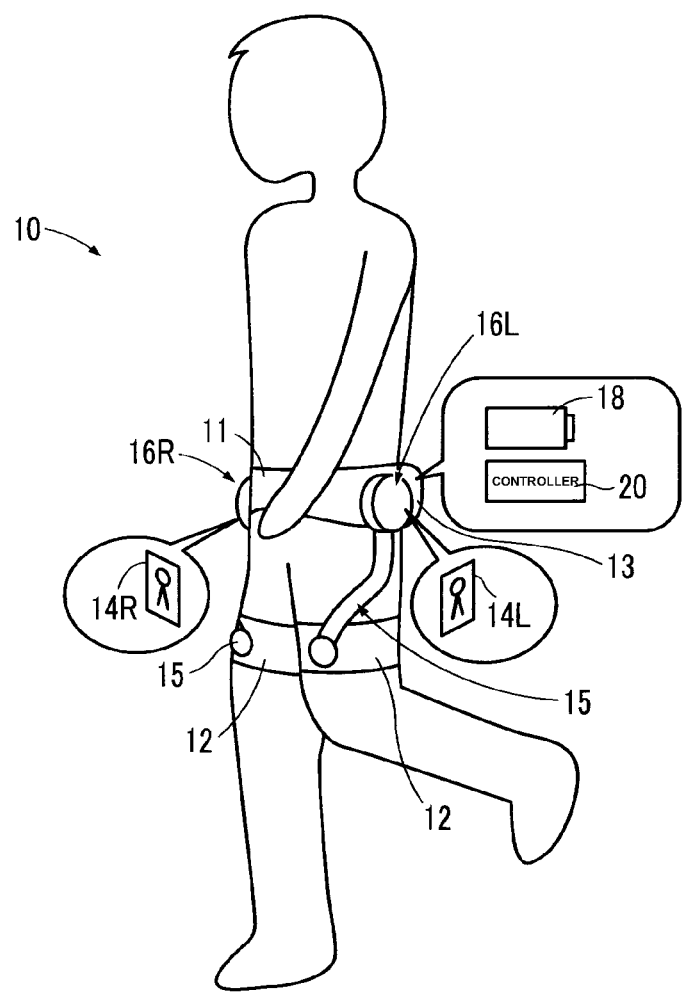
FIG. 1 is a diagram illustrating the construction of a walking assist device in accordance with the present invention.

DESCRIPTION OF THE PREFERRED EMBODIMENTS (Construction of the Walking Assist Device)

A walking assist device as an embodiment of the present invention will be described. In the following description, reference characters "R" and "L" will be used to distinguish the right and the left of legs and the like, but the reference characters will be omitted in the case where there is no need to distinguish between the right and the left or in the case where vectors having right and left components are expressed. Further, signs "+" and "−" will be used to distinguish between the bending motion (the forward motion) and the stretching motion (the backward motion) of each thigh relative to an upper body.

A walking assist device 10 shown in FIG. 1 has a first attachment 11, a pair of right and left second attachments 12, a pair of right and left actuators 16, a battery 18, a controller 20, and hip joint angle sensors 14.

The first attachment 11 is wrapped around the upper body or the hip (a first body portion) of a human being or user. In the first attachment 11, at least the back portion that comes in contact with the back of the human being is formed of a rigid material, such as a lightweight alloy, a hard resin or a carbon fiber, while the remaining portion is formed of a soft material, such as fiber.

Each of the second attachments 12 is formed of a soft material, such as fiber, and wrapped around each thigh (a second body portion) of the human being. Each of the second attachments 12 may alternatively be wrapped around a crus in addition to the thigh or in place of the thigh.

Each of the actuators 16 is composed of an electric motor and has one or both of a speed reducer and a compliance mechanism in addition to the motor, as necessary. When the first attachment 11 is attached to the upper body, the actuators 16 are connected to the first attachment 11 such that the actuators 16 are disposed on the right and left sides of the upper body. The actuators 16 are connected to the second attachments 12 installed to the thighs through connecting members 15 formed of a rigid material, such as a lightweight alloy, a hard resin or a carbon fiber.

With this arrangement, when the actuators 16 are operated, forces are applied to the upper body and the thighs so as to assist the relative motions of the upper body and the thighs. The relative motions of the upper body and the thighs include the longitudinal motions of the thigh of a leg that is off a floor with respect to the upper body and also include the longitudinal motion of the body with respect to a leg that is on the floor.

The battery 18 is housed together with the controller 20 in a case 13 attached to the back portion of the first attachment 11 to supply electric power to the actuators 16, the controller 20 and the like. The location where each of the battery 18 and the controller 20 or the case 13 accommodating them is disposed may be changed, as necessary.

The hip joint angle sensors 14 are composed of rotary encoders disposed on the right and left sides of the waist of the human being, and outputs signals based on hip joint angles. A hip joint angle is defined such that it takes a positive value when a thigh is located in front of a basic forehead surface, while it takes a negative value when the thigh is located behind the basic forehand surface The controller 20 is constituted of a computer, which is comprised of a CPU, a ROM, a RAM, a signal input circuit, a signal output circuit and the like, and software stored in a memory or a storage of the computer. The controller 20 adjusts the electric power supplied from the battery 18 to the actuators 16 and also controls the operations of the actuators 16.

Figure 2:
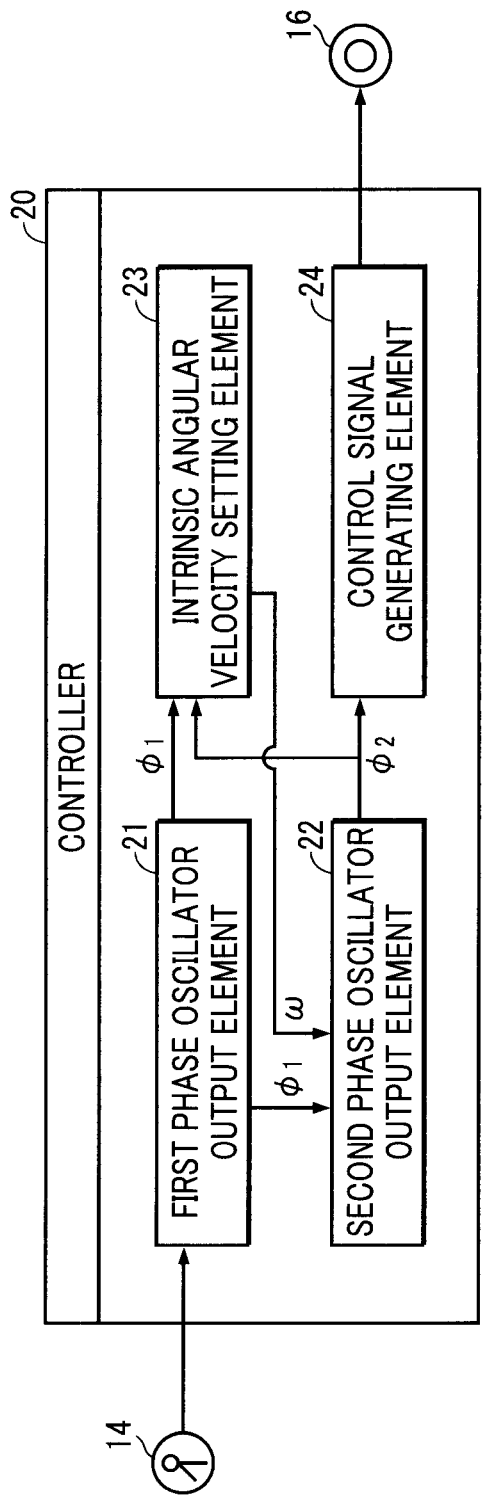
FIG. 2 is a block diagram of a controller of the walking assist device.

As illustrated in FIG. 2, the controller 20 includes a first phase oscillator output element 21, which executes arithmetic processing or exhibits functions, which will be discussed hereinafter, a second phase oscillator output element 22, an intrinsic angular velocity setting element 23, and a control signal generating element 24.

The constituent elements of the controller 20 being configured to carry out arithmetic processing for which they are responsible means that the constituent elements are programmed to read a necessary program and data in the storage and to execute the arithmetic processing for which they are responsible by carrying out arithmetic processing on the data according to the program. Each of the constituent elements may be composed of a single arithmetic processor or a plurality of arithmetic processors that are physically separate.

When an operation switch (not shown) is operated and the electric power is supplied from the battery 18 to the controller 20, the controller 20 is capable of exhibiting functions described below.

(Functions of the Walking Assist Device (First Embodiment))

A first embodiment of the method for controlling the operation of the walking assist device 10 by the controller 20 will be described.

Figure 3:
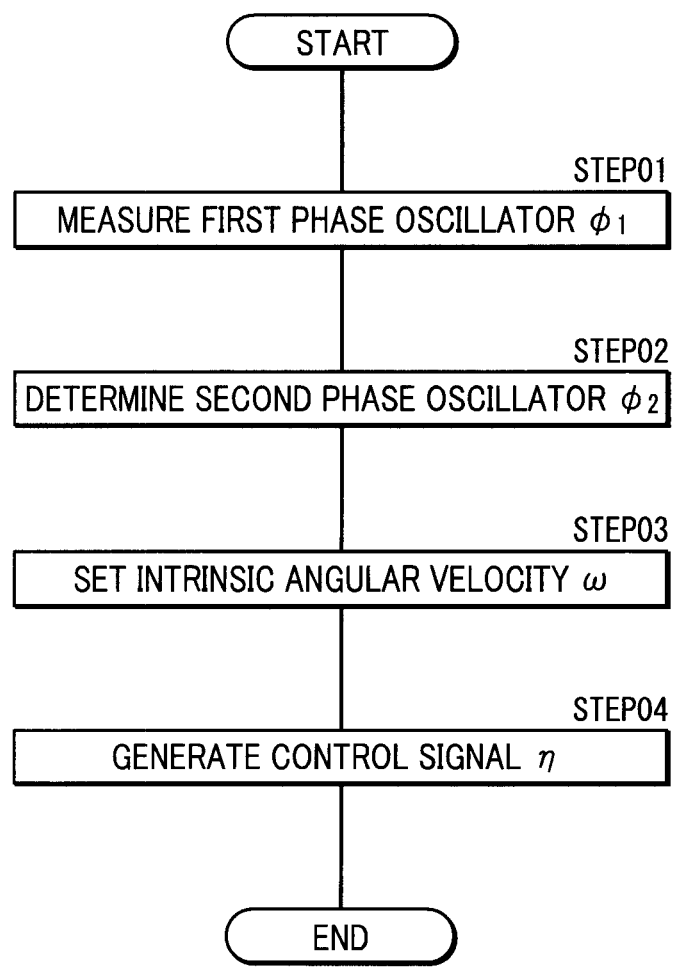
FIG. 3 is a flowchart illustrating a control method for the walking assist device.

First, the first phase oscillator output element 21 measures and outputs the phase of a human periodic motion as a first phase oscillator $\phi_1=(\phi_{1L}, \phi_{1R})$ on the basis of an output of the hip joint angle sensor 14 (STEP01 of FIG. 3).

Figure 4:
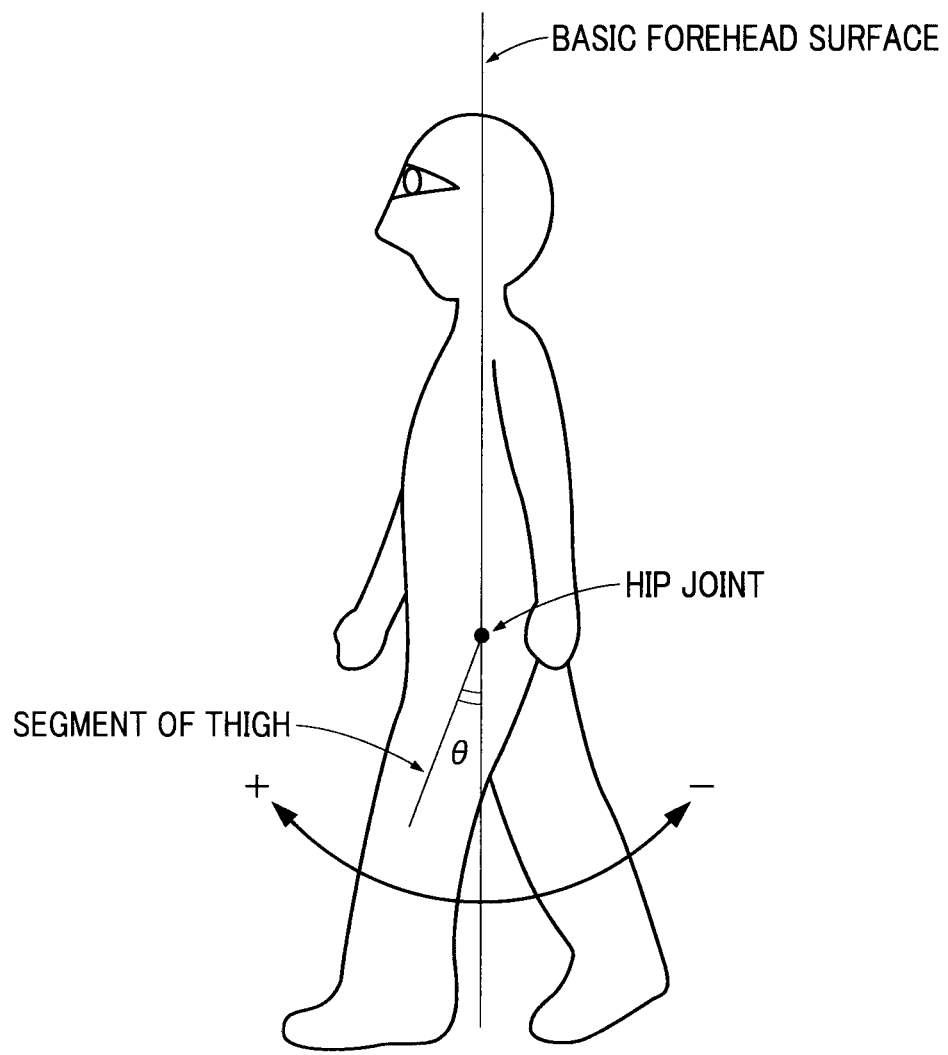
FIG. 4 is an illustration related to a joint angle and a joint angular velocity.

As illustrated in FIG. 4, if a thigh is regarded as a segment having a hip joint location as one end thereof, then a hip joint angle $\theta$ is defined as the angle formed by the segment observed sideways and the basic forehead surface. The basic forehead surface circularly moves about an axial line passing the right and left hip joints as the upper body tilts in the longitudinal direction. The hip joint angle $\theta$ is defined such that it takes a positive value when the segment denoting a thigh is in a state located ahead of the basic forehead surface, while it takes a negative value when the segment is in a state behind the basic forehead surface. Hence, a hip joint angular velocity $(d\theta/dt)$ takes a positive value in a bending motion state, in which a thigh is moving forward, while it takes a negative value in a stretching motion state, in which a thigh is moving backward.

Figure 5:
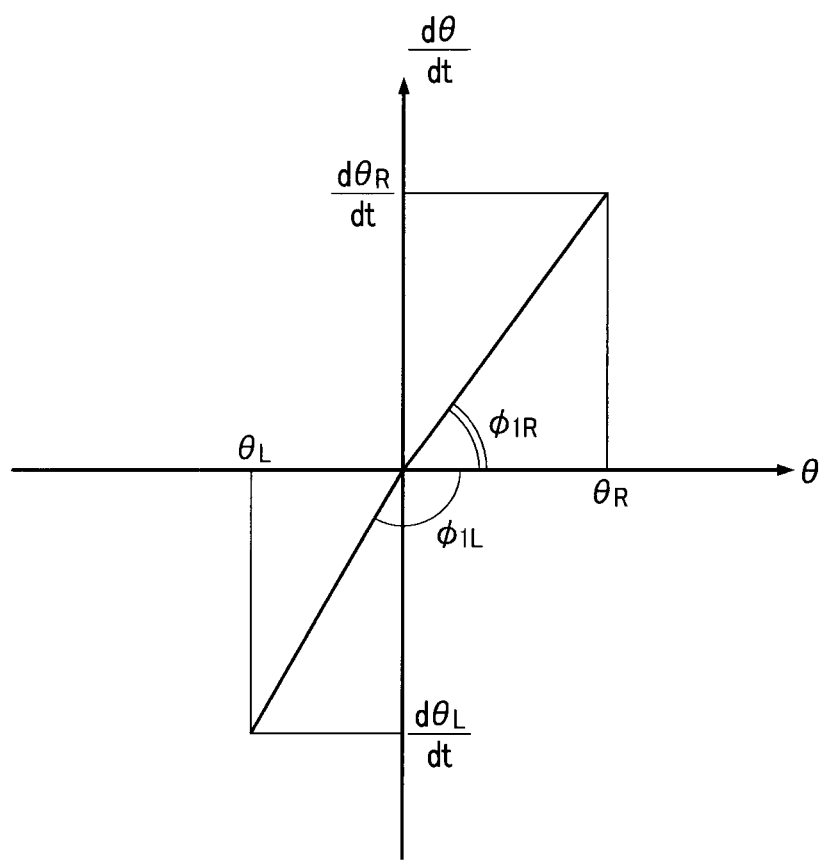
FIG. 5 is a diagram related to a first phase oscillator.

A left component $\phi_{1L}$ of the first phase oscillator $\phi_1$ is represented by, for example, a relational expression (111) and defined as the arctangent function of the ratio of a left hip joint angular velocity $(d\theta_L/dt)$ with respect to a left hip joint angle $\theta_L$ as schematically illustrated in FIG. 5. A right component $\phi_{1R}$ of the first phase oscillator $\phi_1$ is represented by, for example, a relational expression (112) and defined as the arctangent function of the ratio of a right hip joint angular velocity $(d\theta_R/dt)$ with respect to a right hip joint angle $\theta_R$ as schematically illustrated in FIG. 5.

$$\phi_{1L}=\text{arc tan }\{(d\theta_L/dt)/\theta_L\} \quad (111)$$

$$\phi_{1R}=\text{arc tan }\{(d\theta_R/dt)/\theta_R\} \quad (112)$$

A first phase oscillator $\phi_{1q}$(q=L, R) will be $\pi/2$ in a state wherein the segment denoting a thigh during a bending motion agrees with the basic forehead surface, i.e., a state wherein the hip joint angular velocity $(d\theta_q/dt)$ is positive and a hip joint angle $\theta_q$ is zero. Further, the first phase oscillator $\phi_{1q}$ will be zero in a state wherein a leg or a thigh has bent to a maximum extent relative to the upper body, i.e., a state wherein the hip joint angular velocity $(d\theta_q/dt)$ is zero and the hip joint angle $\theta_q$ is positive.

The first phase oscillator $\phi_{1q}$ will be $-\pi/2$ in a state wherein the segment denoting a thigh during a stretching motion agrees with the basic forehead surface, i.e., a state wherein the hip joint angular velocity $(d\theta_q/dt)$ is negative and a hip joint angle $\theta_q$ is zero. Further, the first phase oscillator $\phi_{1q}$ will be $\pi$ or $-\pi$ in a state wherein a leg or thigh has stretched to a maximum extent relative to the upper body, i.e., a state wherein the hip joint angular velocity $(d\theta_q/dt)$ is zero and the hip joint angle $\theta_q$ is negative.

The first phase oscillator $\phi_1$ can be described as a phase indicating the posture and the changing manner of each thigh relative to the upper body (refer to FIG. 5). In this sense, the first phase oscillator $\phi_1$ may be defined by relational expressions (113) and (114), relational expressions (115) and (116) or relational expressions (117) and (118) in place of relational expressions (111) and (112).

$$\phi_{1L}=\text{arc tan }\{\{H((d\theta_L/dt))-H(-(d\theta_L/dt))\}/\theta_L\} \quad (113)$$

$$\phi_{1R}=\text{arc tan }\{\{H((d\theta_R/dt))-H(-(d\theta_R/dt))\}/\theta_R\} \quad (114)$$

$$\phi_{1L}=\text{arc tan }\{(d\theta_L/dt)/\{H(\theta_L)-H(-\theta_L)\}\} \quad (115)$$

$$\phi_{1R}=\text{arc tan }\{(d\theta_R/dt)/\{H(\theta_R)-H(-\theta_R)\}\} \quad (116)$$

$$\phi_{1L}=\text{arc tan }\{(d\theta_L/dt)/(d\theta_L/dt)_{max}\cdot\theta_L/\theta_{Lmax}\} \quad (117)$$

$$\phi_{1R}=\text{arc tan }\{(d\theta_R/dt)/(d\theta_R/dt)_{max}\cdot\theta_R/\theta_{Rmax}\} \quad (118)$$

where H(x) denotes a Heaviside step function and will be 1 if "x" is positive or will be a positive number below 1, such as zero or ½, if "x" is zero, or will be zero if "x" is negative; $(d\theta_L/dt)_{max}$ denotes a maximum value of the left hip joint angular velocity $(d\theta_L/dt)$ in a predetermined past cycle; $\theta_{Lmax}$ denotes a maximum value of the left hip joint angle $\theta_L$ in a predetermined past cycle; and $(d\theta_R/dt)_{max}$ denotes a maximum value of the right hip joint angular velocity $(d\theta_R/dt)$ in a predetermined past cycle; and $\theta_{Rmax}$ denotes a maximum value of the right hip joint angle $\theta_R$ in a predetermined past cycle.

Further, the second phase oscillator output element 22 calculates and outputs the phase of the operation cycle of the walking assist device 10 as a second phase oscillator $\phi_2 = \phi_{2L}$, $\phi_{2R}$) (STEP02 in FIG. 3).

Figure 6:
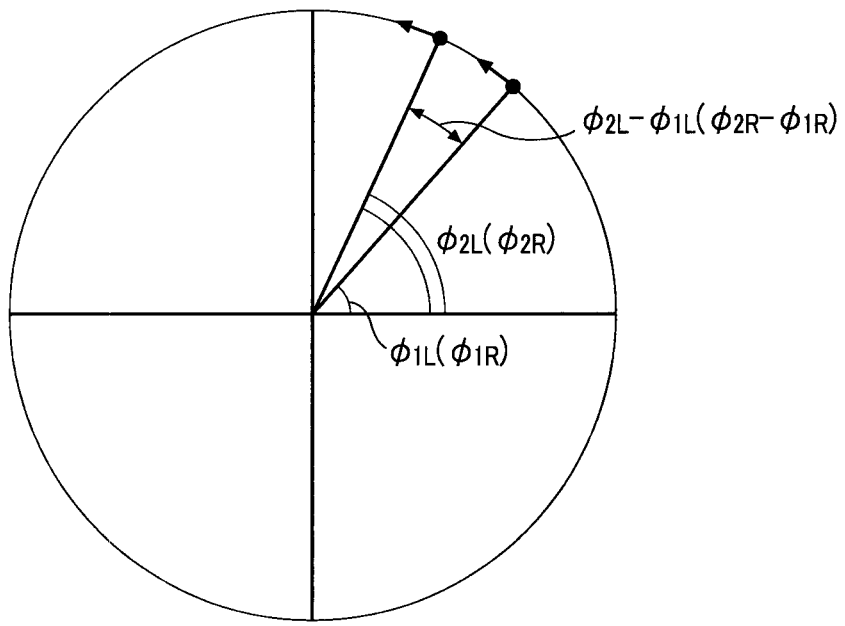
FIG. 6(a) and FIG. 6(b) are diagrams related to the correlation between the first phase oscillator and a second phase oscillator, and the correlation between a left component of the second phase oscillator and a right component of the second phase oscillator.
Figure 6:
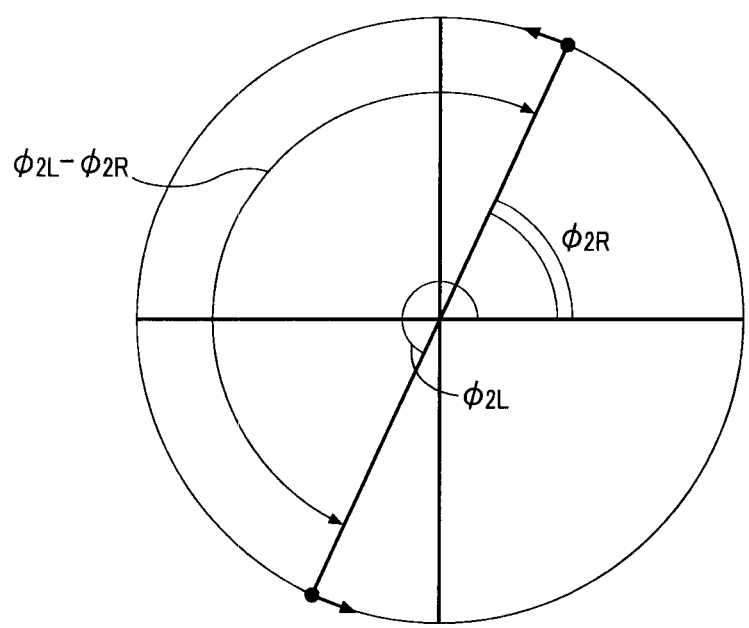
Figure 7:
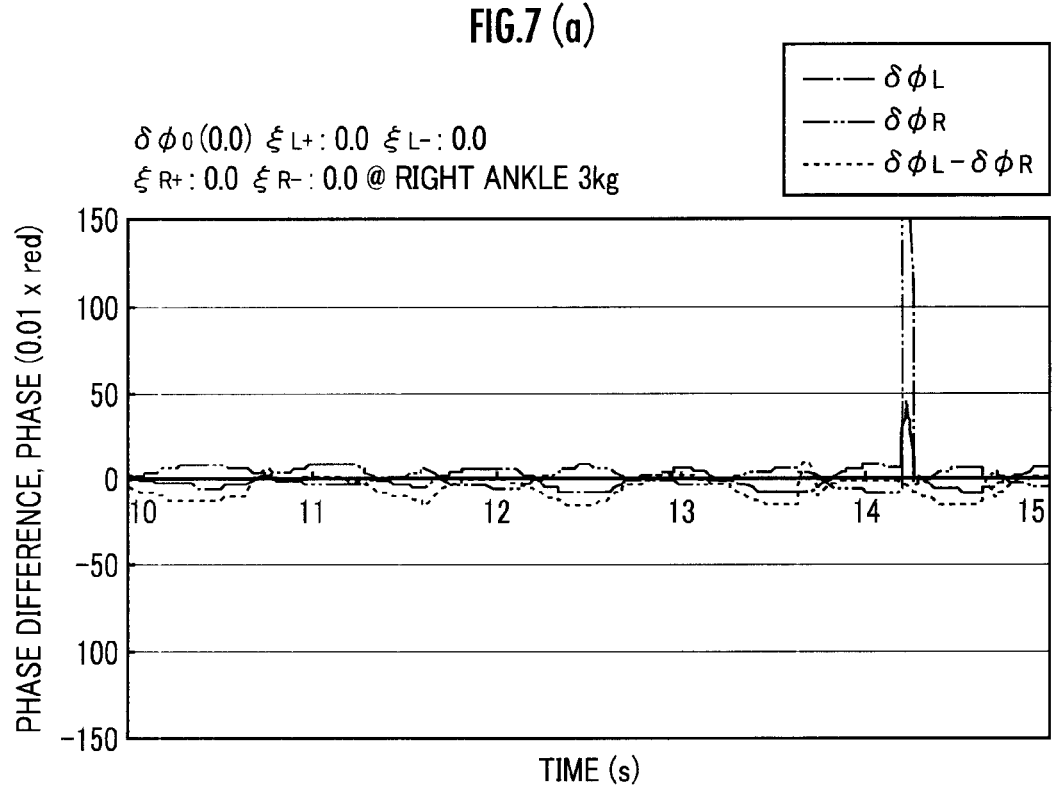
FIG. 7(a) and FIG. 7(b) are diagrams illustrating the results of a first performance experiment with the walking assist device.
Figure 7:
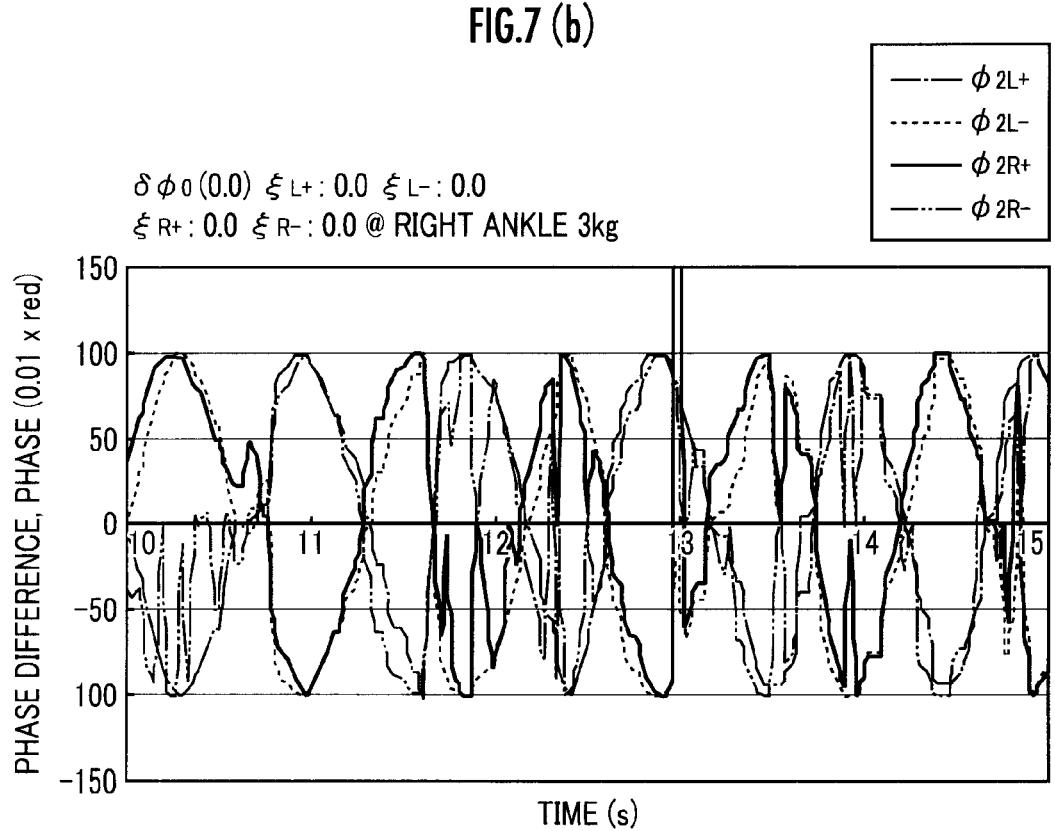

As indicated by an arrow in FIG. 6(*a*), the second phase oscillator $\phi_2$ temporally changes with the first phase oscillator $\phi_1$, having a phase lead (or a phase lag) with respect to the first phase oscillator $\phi_1$. Further, as indicated by an arrow in FIG. 6(*b*), a left component $\phi_{2L}$ of the second phase oscillator and a right component $\phi_{2R}$ of the second phase oscillator temporally change with a phase difference therebetween. The left component $\phi_{2L}$ of the second phase oscillator is a factor that determines the phase of the operation of a left actuator 16L. The right component $\phi_{2R}$ of the second phase oscillator is a factor that determines the phase of the operation of a right actuator 16R.

The right and left components $\phi_{2R}$ and $\phi_{2L}$ of the second phase oscillator $\phi_2$ are calculated by, for example, solving a simultaneous differential equation (120). In the first embodiment, a first component, which provides a basis for setting an intrinsic angular velocity $\omega$, and a second component, which provides a basis for generating a control signal $\eta$, are the same.

$$(d\phi_{2L}/dt) = \omega_L + K_L \sin(\phi_{1L} - \phi_{2L}) + K_{LR} \sin(\phi_{2R} - \phi_{2L})$$

$$(d\phi_{2R}/dt) = \omega_R + K_R \sin(\phi_{1R} - \phi_{2R}) + K_{LR} \sin(\phi_{2L} - \phi_{2R}) \quad (120)$$

To calculate a current second phase oscillator $\phi_2(k)$ (k denoting the number of control cycles), a current first phase oscillator $\phi_1(k)$ measured by the first phase oscillator output element 21 and a previous intrinsic angular velocity $\omega(k-1)$ set by the intrinsic angular velocity setting element 23 as will be discussed hereinafter are substituted into the simultaneous differential equation (120). If k=1, then a value stored in the storage is used as an initial intrinsic angular velocity $\omega(0)$.

$K_L$, denotes a left correlation coefficient indicating the correlation between the left component $\phi_{1L}$ of the first phase oscillator and the left component $\phi_{2L}$ of the second phase oscillator. If a left correlation coefficient $K_L$, is positive, then the right component $\phi_{2R}$ of the second phase oscillator is determined such that the difference between the right component $\phi_{1R}$ of the first phase oscillator and the right component $\phi_{2R}$ of the second phase oscillator decreases. If the left correlation coefficient $K_L$, is negative, then the left component $\phi_{2L}$ of the second phase oscillator is determined such that the difference between the right component $\phi_{1R}$ of the first phase oscillator and the right component $\phi_{2R}$ of the second phase oscillator increases.

$K_R$ denotes a right correlation coefficient indicating the correlation between the right component $\phi_{1R}$ of the first phase oscillator and the right component $\phi_{2R}$ of the second phase oscillator. If a right correlation coefficient $K_R$ is positive, then the right component $\phi_{2R}$ of the second phase oscillator is determined such that the difference between the right component $\phi_{1R}$ of the first phase oscillator and the right component $\phi_{2R}$ of the second phase oscillator decreases. If the left correlation coefficient $K_L$, is negative, then the left component $\phi_{2L}$ of the second phase oscillator is determined such that the difference between the right component $\phi_{1R}$ of the first phase oscillator and the right component $\phi_{2R}$ of the second phase oscillator increases.

$K_{LR}$ denotes a right/left correlation coefficient indicating the correlation between the left component $\phi_{2L}$ of the second phase oscillator and the right component $\phi_{2R}$ of the second phase oscillator. The right/left correlation coefficient $K_{LR}$ is preset to an appropriate value to maintain the difference between the left component $\phi_{2L}$ of the second phase oscillator and the right component $\phi_{2R}$ of the second phase oscillator to $\pi$, or set or corrected, as necessary, by the second phase oscillator output element 22.

Further, the intrinsic angle setting element 23 sets a next intrinsic angular velocity $\omega(k+1)$ to cause a current phase difference $\delta\phi(k)$, which is determined on the basis of the difference between a current first phase oscillator $\phi_1(k)$ and a current second phase oscillator $\phi_2(k)$, to agree with a desired phase difference $\delta\phi_0$ (STEP03 in FIG. 3).

Based on the first phase oscillator $\phi_1$ and the second phase oscillator $\phi_2$, the phase difference $\delta\phi$ is calculated according to relational expressions (131) and (132).

$$\delta\phi_L = \sin(\phi_{1L} - \phi_{2L}) \quad (131)$$

$$\delta\phi_R = \sin(\phi_{1R} - \phi_{2R}) \quad (132)$$

The intrinsic angular velocity $\omega$ is calculated according to an internal model, which includes two virtual oscillators, such that the phase difference $\delta\phi$ approaches a desired phase difference $\delta\phi_0$.

More specifically, first, for each of the right and left components, the phase difference $\delta\phi$ is set as a first phase difference $\delta\phi_1$. Then, provided that the first phase difference $\delta\phi_1$ has remained constant for a specified period of time (e.g., for 3-walking-step period), a phase difference $\theta_h - \theta_m$ between an internal motional oscillator $\theta_h$ and an internal inductive oscillator $\theta_m$ represented by relational expression (135) according to an internal model represented by relational expressions (133) and (134) is determined as a second phase difference $\delta\phi_2$ for each of the right and left components.

$$d\theta_h/dt = \omega_h + \epsilon \sin(\theta_m - \theta_h) \quad (133)$$

$$d\theta_m/dt = \omega_m + \epsilon \sin(\theta_h - \theta_m) \quad (134)$$

$$\delta\phi_2 = \arcsin[(\omega_h - w_m)/2\epsilon] \quad (135)$$

where $\epsilon = (\epsilon L, \epsilon R)$ denotes the correlation coefficient for each of the right and left components of the virtual motional oscillator $\theta_h = (\theta_{hL}, \theta_{hR})$ and the virtual inductive oscillator $\theta_m = (\theta_{mL}, \theta_{mR})$ in a virtual model; and $\omega_h$ denotes the angular velocity of the virtual motional oscillator $\theta_h$; and $\omega_m$ denotes the angular velocity of the virtual inductive oscillator $\theta_m$.

Subsequently, the value of the correlation coefficient $\epsilon$ is set such that a difference $\delta\phi_1 - \delta\phi_2$ between the first phase difference $\delta\phi_1$ and the second phase difference $\delta\phi_2$ is minimized. More specifically, the correlation coefficient $\epsilon$ at discrete time $t_{id}$ (id: integer) at which the first phase oscillator $\phi_1$ becomes zero is sequentially set on each of the right and left components according to relational expression (136).

$$\epsilon(t_{id+1}) = \epsilon(t_{id}) - \eta\{v(t_{id+1}) - V(t_{id})\}/\{\epsilon(t_{id}) - \epsilon(t_{id-1})\},$$

$$V(t_{id-1}) \equiv (\tfrac{1}{2})\{\delta\phi_1(t_{id+1}) - \delta\phi_2(t_{id})\}^2 \quad (136)$$

where each component of $\eta = (\eta_L, \eta_R)$ denotes a coefficient that indicates the stability of a potential $V = (V_L, V_R)$ that brings each of the right and left components of the first phase difference $\delta\phi_1$ and each of the right and left components of the second phase difference $\delta\phi_2$ close to each other.

Subsequently, based on the set value of the correlation coefficient $\epsilon$, the angular velocity $\omega_h$ of the virtual motional oscillator $\theta_h$ is set on each of the components according to relational expression (137) such that each component of the difference $\delta\phi_1-\delta\phi_2$ between the first and the second phase differences is minimized under a condition that the intrinsic angular velocity $\omega_m$ of the virtual inductive oscillator $\theta_m$ remains constant.

$$\omega_h(t_{id}) = -\alpha \int dt ([4\epsilon(t_{id})^2 - \{\omega_h(t) - \omega_m(t_{id})\}^2]^{1/2} \sin[\arcsin\{(\omega_h(t) - \omega_m(t_{id-1}))/2\epsilon(t_{id})\} - \delta\phi_1(t_{id})]) \quad (137)$$

where each component of $\alpha=(\alpha_L, \alpha_R)$ denotes a coefficient indicating the stability of the system.

Subsequently, on each of the right and left components, the angular velocity $\omega_m$ of the virtual inductive oscillator $\theta_m$ is set as a new intrinsic angular velocity $\omega$ on the basis of the angular velocity $\omega_h$ of the virtual motional oscillator $\theta_h$. More specifically, on each of the right and left components, the value of the angular velocity $\omega=(\omega_L, \omega_R)$ of the virtual inductive oscillator $\theta_m$ is set according to relational expression (138) such that the second phase difference $\delta\phi_2$ approaches a desired phase difference $\delta\phi_0$.

$$\omega(t_{id}) = \beta \int dt (4\epsilon(t_{id})^2 - \{\omega_h(t_{id}) - \omega_m(t)\}^2) \sin[\arcsin\{(\omega_h(t_{id}) - \omega_m(t))/2\epsilon(t_{id})\} - \delta\phi_0]) \quad (138)$$

where each component of $\beta=(\beta_L, \beta_R)$ is a coefficient indicating the stability of the system.

The desired phase difference $\delta\phi_0=(\delta\phi_{0L}, \delta\phi_{0L})$ can be arbitrarily set by operating an operation button (not shown) of an operation device capable of communicating with the controller 20 in a wired or wireless manner.

If the phase difference $\delta\phi$ (the first phase difference $\delta\phi_1$) deviates from the desired phase difference $\delta\phi_0$, exceeding a threshold value, or if a current value of the intrinsic angular velocity $\omega$ significantly changes from a previous value to an extent that exceeds a threshold value, then the intrinsic angular velocity $\omega$ may be calculated according to relational expression (139) by using an appropriate gain coefficient $\lambda=(\lambda_L, \lambda_R)$.

$$\omega_L(k+1) = \omega_L(k) + \lambda_L(\delta\phi_L(k) - \delta\phi_{0L}), \omega_R(k+1) = \omega_R(k) + \lambda_R(\delta\phi_R(k) - \delta\phi_{0R}) \quad (139)$$

Further, the control signal generating element 24 generates a control signal $\eta$ on the basis of the second phase oscillator $\phi_2$ (STEP04 in FIG. 3).

For example, the control signal $\eta$ is generated according to relational expressions (141) and (142) on the basis of a first control coefficient $C_1$ and a second control coefficient $C_2$.

$$\eta_L = C_{1L} \sin\phi_{2L} + C_{2L} \quad (141)$$

$$\eta_R = C_{1R} \sin\phi_{2R} + C_{2R} \quad (142)$$

Alternatively, the first control coefficient $C_1$ may be sequentially set according to relational expression (1410), which uses a predetermined learning coefficient $\gamma_1=(\gamma_{1L}, \gamma_{1R})$ on the basis of the phase difference $\delta\phi$ (refer to relational expressions (131) and (132)). "k" denotes an index indicating a control cycle.

$$C_{1L}(k+1) = C_{1L}(k) + \gamma_{1L}(\delta\phi_L(k) - \delta\phi_L(k-1))/(C_{1L}(k) - C_{1L}(k-1)),$$

$$C_{1R}(k+1) = C_{1R}(k) + \gamma_{1R}(\delta\phi_R(k) - \delta\phi_R(k-1))/(C_{1R}(k) - C_{1R}(k-1)) \quad (1410)$$

Alternatively, the second control coefficient $C_2$ may be sequentially set according to relational expression (1420), which uses a predetermined learning coefficient $\gamma_2=(\gamma_{2L}, \gamma_{2R})$ also on the basis of the phase difference $\delta\phi$.

$$C_{2L}(k+1) = C_{2L}(k) - \gamma_{2L}(E(k) - E(k-1))/(C_{2L}(k) - C_{2L}(k-1)),$$

$$C_{2R}(k+1) = C_{2R}(k) + \gamma_{2R}(E(k) - E(k-1))/(C_{2R}(k) - C_{2R}(k-1)) \quad (1420)$$

"E(k)" denotes an energy function defined by relational expression (1422) on the basis of a desired walking ratio $F1_{ref}$ and a measured walking ratio (a mean value over a predetermined past period) $F1_{meas}$.

$$E(k) = (1/2)(F1_{ref} - F1_{meas})^2 \quad (1422)$$

Alternatively, at least one of the first control coefficient $C_1$ and the second control coefficient $C_2$ may be set according to the aforesaid relational expression on the basis of a difference between the right and left components $\phi_{1L} - \phi_{1R}$ of the first phase oscillator $\phi_1$ in place of the phase difference $\delta\phi$.

Then, the controller 20 adjusts current $I=(I_L, I_R)$ supplied from the battery 18 to the right and left actuators 16R and 16L, respectively, according to the control signal $\eta$. This adjusts $F=(F_L, F_R)$, which is a force assisting the bending motion and the stretching motion of the right and left thighs relative to the upper body through the intermediary of the first attachment 11 and the second attachments 12 or a rotative force around a hip joint. The assisting force F is expressed as, for example, $F(t) = G \cdot I(t)$ (G: proportional coefficient) on the basis of the current I.

Thereafter, it is determined whether an operation end condition has been satisfied, the condition being, for example, whether the operation switch has been changed from ON to OFF or an operation failure has been detected. If the result of the determination is negative, then the aforesaid series of processing is repeated. If the result of the determination is affirmative, then the aforesaid series of processing is terminated.

(Functions of the Walking Assist Device (Second Embodiment))

A second embodiment of the method for controlling the operation of a walking assist device 10 by a controller 20 will be described. The method for measuring a first phase oscillator $\phi_1$ by a first phase oscillator output element 21 (STEP01 in FIG. 3) and the method for setting an intrinsic angular velocity $\omega$ by an intrinsic angle setting element 23 (STEP03 in FIG. 3) are the same as those in the first embodiment, and therefore, the descriptions thereof will be omitted.

A second phase oscillator output element 22 generates a second phase oscillator $\phi_2$ such that a first component thereof, which provides the basis for setting the intrinsic angular velocity $\omega$, and a second component thereof, which provides the basis for generating a control signal $\eta$, are different from each other (STEP02 in FIG. 3).

More specifically, a first component $\phi_{21}=(\phi_{2L}, \phi_{2R})$ of the second phase oscillator $\phi_2$ is determined as the solution of simultaneous differential equation (120). Further, second components $\phi_{22}=(\phi_{2L+}, \phi_{2L-}, \phi_{2R+}, \phi_{2R-})$ of the second phase oscillator $\phi_2$ are determined as the solutions of differential equations (221) to (224), respectively.

$$(d\phi_{2L+}/dt) = \omega_L + K_L \sin(\phi_{1L} - \phi_{2L+} - \xi_{L+}) \quad (221)$$

$$(d\phi_{2R+}/dt) = \omega_R + K_R \sin(\phi_{1R} - \phi_{2R+} - \xi_{R+}) \quad (222)$$

$$(d\phi_{2L-}/dt) = \omega_L + K_L \sin(\phi_{1L} - \phi_{2L-} - \xi_{L-}) \quad (223)$$

$$(d\phi_{2R-}/dt) = \omega_R + K_R \sin(\phi_{1R} - \phi_{2R-} - \xi_{R-}) \quad (224)$$

"$\xi_{L+}$" denotes a desired phase difference of the left bending component $\phi_{2L+}$ of the second phase oscillator $\phi_2$ relative to the left component $\phi_{2L}$ of the second phase oscillator determined as the solution of the simultaneous differential equation (120). If the value of $\xi_{L+}$ is negative, then the bending start point of time (i.e., the stretching end point of time) of the left leg becomes earlier than that in the case where $\xi_{L+}$ is zero. In this case, as the absolute value of $\xi_{L+}$ increases, the bending start point of time of the left leg becomes earlier. Meanwhile, if the value of $\xi_{L+}$ is positive, then the bending start point of time of the left leg becomes later than that in the case where $\xi_{L-}$ is zero. In this case, as the absolute value of $\xi_{L+}$ increases, the bending start point of time of the left leg becomes later.

"$\xi_{L-}$" denotes a desired phase difference of the left stretching component $\phi_{2L-}$ of the second phase oscillator relative to the left component $\phi_{2L}$ of the second phase oscillator $\phi_2$. If the value of $\xi_{L-}$ is negative, then the stretching start point of time (i.e., the bending end point of time) of the left leg becomes earlier than that in the case where $\xi_{L-}$ is zero. In this case, as the absolute value of $\xi_{L-}$ increases, the stretching start point of time of the left leg becomes earlier. Meanwhile, if the value of $\xi_{L-}$ is positive, then the stretching start point of time of the left leg becomes later than that in the case where $\xi_{L-}$ is zero. In this case, as the absolute value of $\xi_{L-}$ increases, the stretching start point of time of the left leg becomes later.

"$\xi_{R+}$" denotes a desired phase difference of the right bending component $\phi_{2R+}$ of the second phase oscillator $\phi_2$ relative to the right component $\phi_{2R}$ of the second phase oscillator determined as the solution of the simultaneous differential equation (120). If the value of $\xi_{R+}$ is negative, then the bending start point of time (i.e., the stretching end point of time) of the right leg becomes earlier than that in the case where $\xi_{R+}$ is zero. In this case, as the absolute value of $\xi_{R+}$ increases, the bending start point of time of the right leg becomes earlier. Meanwhile, if the value of $\xi_{R+}$ is positive, then the bending start point of time of the right leg becomes later than that in the case where $\xi_{R+}$ is zero. In this case, as the absolute value of $\xi_{R+}$ increases, the bending start point of time of the right leg becomes later.

"$\xi_{R-}$" denotes a desired phase difference of the right stretching component $\phi_{2R-}$ of the second phase oscillator relative to the right component $\phi_{2R}$ of the second phase oscillator $\phi_2$. If the value of $\xi_{R-}$ is negative, then the stretching start point of time (i.e., the bending end point of time) of the right leg becomes earlier than that in the case where $\xi_{R-}$ is zero. In this case, as the absolute value of $\xi_{R-}$ increases, the stretching start point of time of the right leg becomes earlier. Meanwhile, if the value of $\xi_{R-}$ is positive, then the stretching start point of time of the right leg becomes later than that in the case where $\xi_{R-}$ is zero. In this case, as the absolute value of $\xi_{R-}$ increases, the stretching start point of time of the right leg becomes later.

The desired phase difference $\xi=(\xi_{L+}, \xi_{L-}, \xi_{R+}$ or $\xi_{R-})$ can be arbitrarily set by operating an operation button (not shown) of an operation device capable of communicating with a controller 20 in a wired or wireless manner. Thus, for example, asymmetrically controlling the bending start point of time (the stretching end point of time) and the stretching start point of time (the bending end point of time) of each leg makes it possible to assist in an appropriate manner the walking motion of a user, who has a difference in motional function between his/her right and left legs due to a paralyzed leg or the like, in view of the asymmetrical motional function.

Alternatively, the desired phase difference $\xi$ may be sequentially set according to relational expression (2200), which uses a predetermined learning coefficient $\gamma=(\gamma_{L+}, \gamma_{L-}, \gamma_{R+}$ or $\gamma_{R-})$, on the basis of the phase difference $\delta\phi$.

$\xi_{L+}(k+1)=\xi_{L+}(k)+\gamma_{L+}(\delta\phi_L(k)-\delta\phi_L(k-1))/(\xi_{L+}(k)-\xi_{L+}(k-1))$, $\xi_{L-}(k+1)=\xi_{L-}(k)+\gamma_{L-}(\delta\phi_L(k)-\delta\phi_L(k-1))/(\delta_{L-}(k)-\xi_{L-}(k-1))$, $\xi_{R+}(k+1)=\xi_{R+}(k)+\gamma_{R+}(\delta\phi_R(k)-\delta\phi_R(k-1))/(\xi_{R+}(k)-\xi_{R+}(k-1))$, $\xi_{R-}(k+1)=\xi_{R-}(k)+\gamma_{R-}(\delta\phi_R)(k)-\delta\phi_R(k-1))/(\xi_{R-}(k)-\xi_{R-}(k-1))$, (2200)

The desired phase difference $\xi$ may alternatively be set according to the aforesaid relational expression on the basis of a difference of the left and right components $\phi_{1L}-\phi_{1R}$ of the first phase oscillator $\phi_1$ in place of the phase difference $\delta\phi$.

Then, a control signal generating element 24 generates a control signal $\eta$ according to each of the relational expressions (241) and (242) on the basis of a second component $\phi_{22}$ of the second phase oscillator $\phi_2$, a first control coefficient $C_1=(C_{1L+}, C_{1L-}, C_{1R+}$ or $C_{1R-})$ and a second control coefficient $C_2=(C_{2L}$ or $C_{2R})$ (STEP04 in FIG. 3).

$\eta_L=C_{1L+}\sin\phi_{2L+}-C_{1L-}\sin\phi_{2L-}+C_{2L}$ (241)

$\eta_R=C_{1R+}\sin\phi_{2R+}-C_{1R-}\sin\phi_{2R-}+C_{2R}$ (242)

Functions of the Walking Assist Device (Third Embodiment))

A third embodiment of the method for controlling the operation of a walking assist device 10 by a controller 20 will be described. The third embodiment is the same as the first embodiment except for the method for generating a control signal $\eta$, so that the description of the same arithmetic processing will be omitted.

The control signal generating element 24 adjusts the values of a first control coefficient $C_1=(C_{1L}$ or $C_{1R})$ and a second control coefficient $C_2=(C_{2L}$ or $C_{2R})$ in relational expressions (141) and (142), respectively, according to relational expressions (143) and (144), respectively, to generate a control signal $\eta$ (STEP04 in FIG. 3).

$C_{1L}=C_{1R}=(½)C\arcsin(W_0/L_{LEG})$ (143)

where $W_0$ denotes a desired stride length; $L_{LEG}$ denotes the length of a leg (the distance from a hip joint to a sole of a human being); and C denotes a gain coefficient (a fixed value).

$C_{2L}=(½)C(|\theta_{Lmax}|+|\theta_{Rmin}|), C_{2R}=(½)C(|\theta_{Rmax}|+|\theta_{Lmin}|)$ (144)

$\theta_{Lmax}$ denotes a maximum value in one past cycle of the left hip joint angle $\theta_L$ (the left hip joint angle $\theta_L$ in a state wherein the left leg has bent to a maximum extent relative to the upper body) or the mean value of maximum values over a plurality of past cycles; and $\theta_{Lmin}$ denotes a minimum value in one past cycle of the left hip joint angle $\theta_L$ (the left hip joint angle $\theta_L$ in a state wherein the left leg has stretched to a maximum extent relative to the upper body) or the mean value of minimum values over a plurality of past cycles.

Similarly, $\theta_{Rmax}$ denotes a maximum value of the right hip joint angle $\theta_R$ in one past cycle from the present time (the right hip joint angle $\theta_R$ in a state wherein the right leg has bent to a maximum extent relative to the upper body) or the mean value of maximum values over a plurality of past cycles; and $\theta_{Rmin}$ denotes a minimum value of the right hip joint angle $\theta_R$ in one past cycle from the present time (the right hip joint angle $\theta_R$ in a state wherein the right leg has stretched to a maximum extent relative to the upper body) or the mean value of minimum values over a plurality of past cycles.

(Functions of the Walking Assist Device (Fourth Embodiment))

A fourth embodiment of the method for controlling the operation of a walking assist device 10 by a controller 20 will be described. The fourth embodiment is the same as the second embodiment except for the method for generating a control signal η, so that the description of the same arithmetic processing will be omitted.

The control signal generating element 24 adjusts the values of a first control coefficient $C_1=(C_{1L+}, C_{1L-}, C_{1R+}$ or $C_{1R-})$ and a second control coefficient $C_2=(C_{2L}$ or $C_{2R})$ in relational expressions (241) and (242), respectively, according to relational expressions (243) and (244), respectively, to generate a control signal η (STEP04 in FIG. 3).

$$C_{1L+}=C_{1L-}=C_{1R+}=C_{1R-}=(1/2)C\text{arc sin}(W_0/L_{LEG}) \quad (243)$$

$$C_{2L}=C|\theta_{Lmin}|+(1/2)C(|\theta_{Lmax}|+|\theta_{Rmin}|),$$

$$C_{2R}=C|\theta_{Rmin}|+(1/2)C(|\theta_{Rmax}|+|\theta_{Lmin}|) \quad (244)$$

(Functions of the Walking Assist Device (Fifth Embodiment))

According to a fifth embodiment, the value of the gain coefficient C in each of the third embodiment and the fourth embodiment is set by a control signal generating element 24 as follows.

First, an evaluation function E is calculated according to relational expression (541).

$$E=(1/2)(W_0-\Sigma_j W(j)/N)^2 \quad (541)$$

W(j) denotes a stride length in a j-th past walking cycle from the present time. The stride length W(j) is calculated according to relational expression (543) in, for example, the walking cycle of a bending motion of the left leg, while it is calculated according to relational expression (544) in the walking cycle of a bending motion of the right leg. Used at this time is a waveform signal, which is based on an output of a hip joint angle sensor 14 in the walking cycle and which denotes a changing manner of the hip joint angle. $\Sigma_j W(j)/N$ denotes a mean stride length over successive past N cycles (N is, for example, 3).

$$W(j)=L_{LEG}\sin(|\theta_{Lmax}|+|\theta_{Rmin}|) \quad (543)$$

$$W(j)=L_{LEG}\sin(|\theta_{Rmax}|+|\theta_{Lmin}|) \quad (544)$$

A current value C(k) of the gain coefficient is calculated according to relational expression (545) on the basis of a previous value C(k−1), a current value E(k) of the evaluation function E, and a previous value E(k−1).

$$C(k)-C(k-1)=-\tau(E(k)-E(k-1))/\Delta t \quad (545)$$

where τ denotes a learning speed coefficient; and Δt denotes the control cycle of the controller 20.

(Operation and Advantage of the Walking Assist Device)

According to a walking assist device 10 exhibiting the aforesaid functions, a second phase oscillator $\phi_2$, which provides a basis for controlling the phase of the periodic operation of each of actuators 16 (refer to STEP02 in FIG. 3), is based on the difference between a first phase oscillator $\phi_1$, which indicates the phase of the periodic motion of each thigh relative to the upper body of a human being, and the second phase oscillator $\phi_2$ and an intrinsic angular velocity ω. Parameters except the coefficient of the correlation between the first phase oscillator and the second phase oscillator (a left correlation coefficient $K_L$ and a right correlation coefficient $K_R$), the coefficient of the correlation between the components of the second phase oscillator (right/left correlation coefficient $K_{LR}$), and the intrinsic angular velocity ω can be excluded from parameters to be set or adjusted, thus making it possible to reduce the number of the parameters (refer to relational expressions (120) and (221) to (224)).

Meanwhile, a current intrinsic angular velocity ω(k) is set by correcting a previous intrinsic angular velocity ω(k−1) by an amount based on a previous difference δφ(k−1) between the first phase oscillator $\phi_1$ and the second phase oscillator $\phi_2$ such that the previous difference δφ(k−1) approaches a desired difference $\delta\phi_0$ (STEP03 in FIG. 3 and relational expressions (131) to (134)). With this arrangement, each of the actuators 16 can be operated at appropriate cycles in view of the motion cycle of the human being to be assisted and also each of second attachments 12 can be periodically moved in relation to a first attachment 11.

For example, the desired difference $\delta\phi_0$ is set to a lead-angle side, i.e., a negative value, so as to control the operation of the walking assist device 10 such that the relative postures of the first attachment 11 and the second attachments 12 change before the relative postures of the thighs with respect to the upper body of the human being change. This causes the operation of the walking assist device 10 to enhance or promote the walking motion of the human being, thus leading to an increased walking speed.

In contrast thereto, the desired difference $\delta\phi_0$ is set to a retard-angle side, i.e., a positive value, so as to control the operation of the walking assist device 10 such that the relative postures of the first attachment 11 and the second attachments 12 change to follow the change in the relative postures of the thighs with respect to the upper body of the human being. This causes the operation of the walking assist device 10 to impart resistance to the walking motion of the human being, thus leading to a decreased walking speed.

According to the third and the fourth embodiments, a control signal η that defines the amplitude of the operation of each of the actuators 16 is generated on the basis of the ratio of the desired stride length $W_0$ with respect to the length of a leg $L_{LEG}$ of a human being according to an increasing function having the ratio $W_0/L_{LEG}$ as a variable (refer to relational expressions (141) to (143) and relational expressions (241) to (243)).

According to the fifth embodiment, a control signal η that defines the amplitude of the operation of each of the actuators 16 is generated on the basis of the length of a leg $L_{LEG}$ of a human being and a waveform signal that indicates the temporal change of each hip joint angle θ obtained from each joint angle sensor 14 such that the difference between the mean stride length $\Sigma_j W(j)/N$ of the human being over a plurality of past cycles and the desired stride length $W_0$ of the human being decreases (refer to relational expressions (543) to (545)).

According to the walking assist device having the construction described above, the amplitudes of the periodic operations of the actuators 16, i.e., the magnitudes of the displacements of the second attachments 12 relative to the first attachment 11 in the longitudinal direction, can be controlled according to the magnitude of the desired stride length $W_0$ of the human being. Thus, the walking motion of the human being can be assisted so as to bring the stride length W of the human being close to the desired stride length $W_0$.

The output forms of the first phase oscillator $\phi_1$ and the second phase oscillator $\phi_2$ in the case where the walking assist device as the second embodiment of the present invention is attached to a subject have been observed. The subject, who is physically unimpaired, had a 3-kg weight attached to his/her right ankle in order to intentionally make the motional functions of the right and the left legs asymmetrical.

FIG. 7 to FIG. 14 illustrate the temporal change forms of the second phase oscillator $\phi_2$ and the like observed on different set values of the desired phase difference $\delta\phi_0 = (\delta\phi_{0L}$ or $\delta\phi_{0R})$ (refer to relational expression (138)) and another desired phase difference $\xi = (\xi_{L+}, \xi_{L-}, \xi_{R+}$ or $\xi_{R-})$ (refer to relational expressions (221) to (224)).

Shown on the left side in each diagram are the output results of a left component of a phase difference $\delta\phi_L$ (indicated by a one-dot chain line), a right component of the phase difference $\delta\phi_R$ (indicated by a two-dot chain line), and the difference therebetween $\delta\phi_L - \delta\phi_R$ (indicated by a dashed line). Shown on the right side in each diagram are the output results of a left bending component $\phi_{2L+}$ of a second phase oscillator $\phi_2$ (indicated by a one-dot chain line), a left stretching component $\phi_{2L-}$ thereof (indicated by a dashed line), a right bending component $\phi_{2R+}$ thereof (indicated by a solid line), and a right stretching component $\phi_{2R-}$ thereof (indicated by a two-dot chain line).

FIG. 7(a) and FIG. 7(b) illustrate the output results obtained in the case where $\delta\phi_{0L} = \delta\phi_{0R} = \xi_{L+} = \xi_{L-} = \xi_{R+} = \xi_{R-} = 0$ [rad]. In this case, since $\delta\phi_{0L} = \delta\phi_{0R} = 0$, the operations of the actuators 16 will be controlled such that the motions of the right and left second attachments 12 relative to the first attachment 11 synchronize with and follow the motions of the right and left thighs relative to the torso of the subject.

FIG. 8(a) and FIG. 8(b) illustrate the output results obtained in the case where $\delta\phi_{0L} = \delta\phi_{0R} = -0.2$ [rad], $\xi_{L+} = \xi_{L-} = 0$ [rad], $\xi_{R+} = -0.6$ [rad], and $\xi_{R-} = 0.6$ [rad]. In this case, $\delta\phi_{0L} < 0$ and $\delta\phi_{0R} < 0$, so that the operations of the actuators 16 are controlled such that the motions of the right and left second attachments 12 relative to the first attachment 11 lead the motions of the right and left thighs relative to the torso of the subject. Further, $\xi_{R+} < 0$ and $\xi_{R-} > 0$, so that the operation of the right actuator 16R is controlled such that the bending start point of time of the right leg of the subject is advanced, whereas the stretching start point of time of the right leg is delayed, as compared with the case illustrated in FIG. 7.

FIG. 9(a) and FIG. 9(b) illustrate the output results obtained in the case where $\delta\phi_{0L} = \delta\phi_{0R} = -0.2$ [rad], $\xi_{L+} = \xi_{L-} = 0$ [rad], and $\xi_{R+} = \xi_{R-} = -0.6$ [rad]. In this case, $\xi_{R+} < 0$ and $\xi_{R-} < 0$, so that the operation of the right actuator 16R is controlled such that the bending start point of time and the stretching start point of time of the right leg of the subject are advanced, as compared with the case illustrated in FIG. 7.

FIG. 10(a) and FIG. 10(b) illustrate the output results obtained in the case where $\xi\phi_{0L} = \xi\phi_{0R} = -0.2$ [rad], $\xi_{L+} = \xi_{L-} = 0$ [rad], and $\xi_{R+} = \xi_{R-} = -0.8$ [rad]. The operation of the right actuator 16R is controlled such that the bending start point of time and the stretching start point of time of the right leg of the subject are further advanced by the magnitudes of the absolute values of $\xi_{R+}$ and $\xi_{R-}$, as compared with the case illustrated in FIG. 9.

FIG. 11(a) and FIG. 11(b) illustrate the output results obtained in the case where $\delta\phi_{0L} = \delta\phi_{0R} = -0.2$ [rad], $\xi_{L+} = \xi_{L-} = 0$ [rad], and $\xi_{R+} = \xi_{R-} = 0.6$ [rad]. In this case, $\xi_{R+} > 0$ and $\xi_{R-} > 0$, so that the operation of the right actuator 16R is controlled such that the bending start point of time and the stretching start point of time of the right leg of the subject are delayed, as compared with the case illustrated in FIG. 7.

FIG. 12(a) and FIG. 12(b) illustrate the output results obtained in the case where $\delta\phi_{0L} = \delta\phi_{0R} = -0.2$ [rad], $\xi_{L+} = \xi_{L-} = 0.8$ [rad], and $\xi_{R+} = \xi_{R-} = 0$ [rad]. In this case, $\xi_{L+} > 0$ and $\xi_{L-} > 0$, so that the operation of the left actuator 16L is controlled such that the bending start point of time and the stretching start point of time of the left leg of the subject are delayed, as compared with the case illustrated in FIG. 7.

FIG. 13(a) and FIG. 13(b) illustrate the output results obtained in the case where $\delta\phi_{0L} = \delta\phi_{0R} = 0.2$ [rad], $\xi_{L+} = \xi_{L-} = -0.6$ [rad], and $\xi_{R+} = \xi_{R-} = 0$ [rad]. In this case, $\delta\phi_{0L} > 0$ and $\delta\phi_{0R} > 0$, so that the operations of the actuators 16 are controlled such that the motions of the right and left second attachments 12 relative to the first attachment 11 follow, with a delay, the motions of the right and left thighs relative to the torso of the subject. Further, $\xi_{L+} < 0$ and $\xi_{L-} < 0$, so that the operation of the left actuator 16L is controlled such that the bending start point of time and the stretching start point of time of the left leg of the subject are advanced, as compared with the case illustrated in FIG. 7.

FIG. 14(a) and FIG. 14(b) illustrate the output results obtained in the case where $\delta\phi_{0L} = \delta\phi_{0R} = 0$ [rad], $\xi_{L+} = \xi_{L-} = -0.6$ [rad], and $\xi_{R+} = \xi_{R-} = 0$ [rad].

Figure 8:
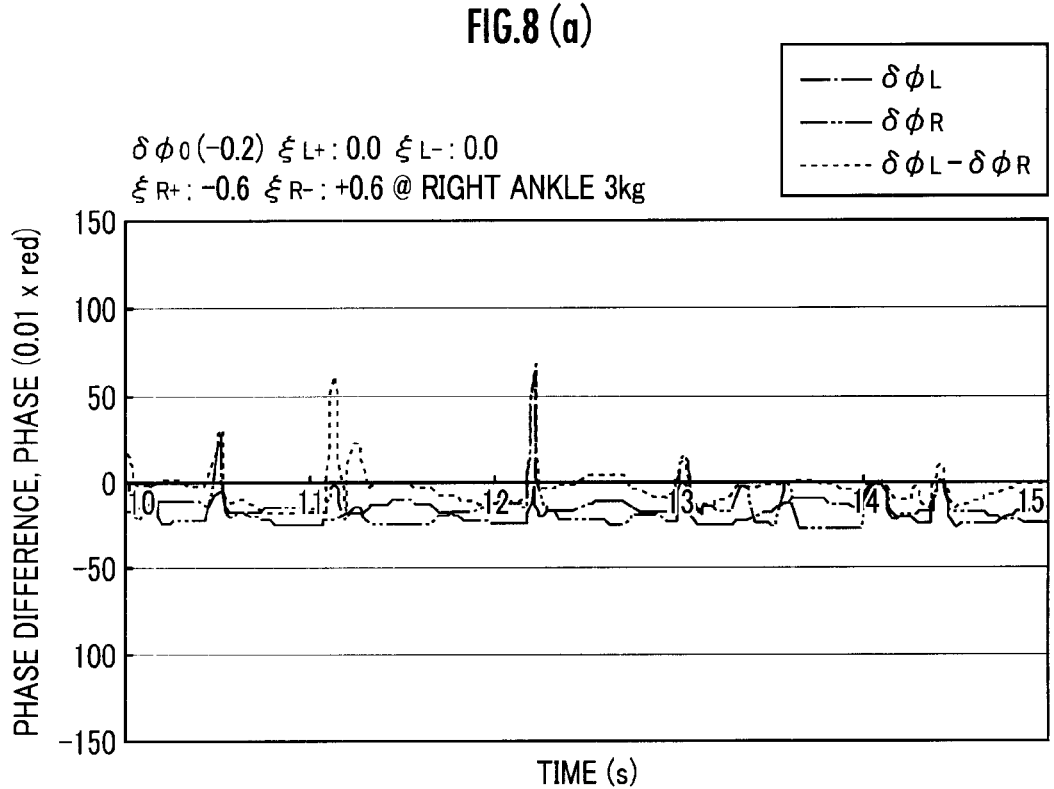
FIG. 8(a) and FIG. 8(b) are diagrams illustrating the results of a second performance experiment with the walking assist device.
Figure 8:
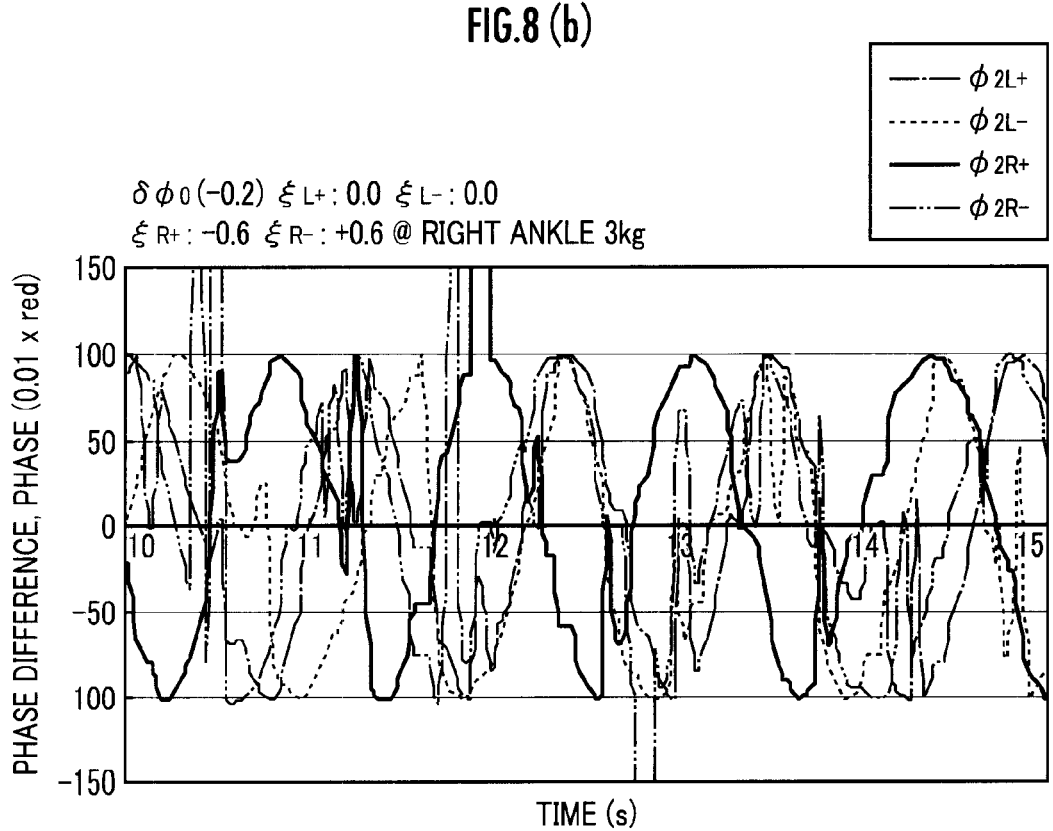
Figure 9:
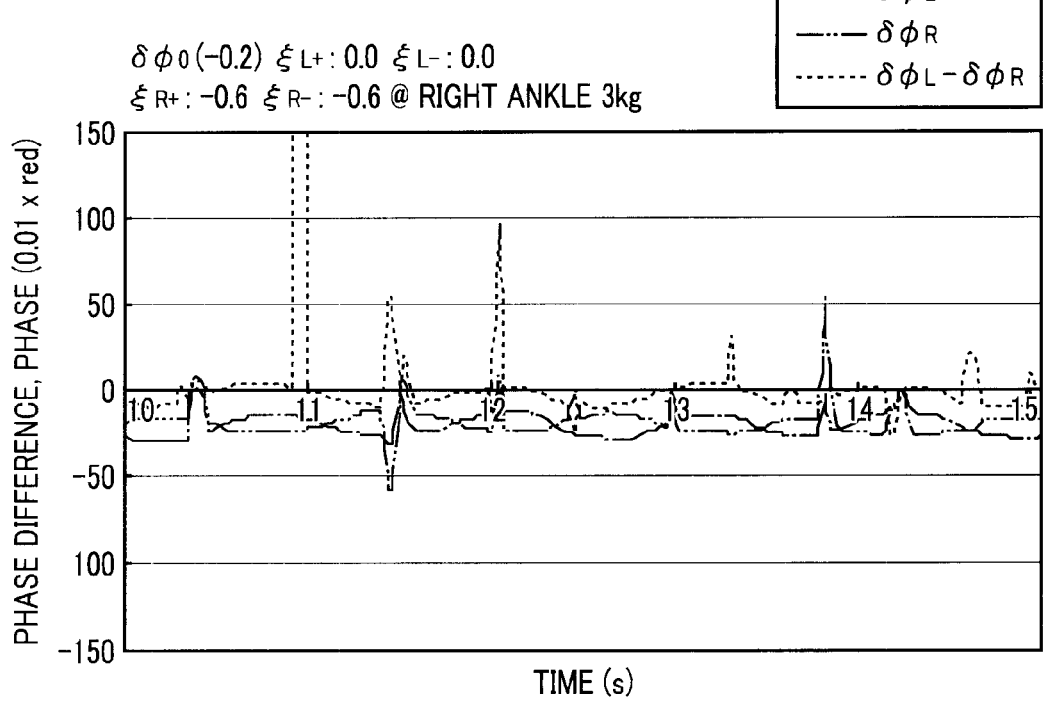
FIG. 9(a) and FIG. 9(b) are diagrams illustrating the results of a third performance experiment with the walking assist device.
Figure 9:
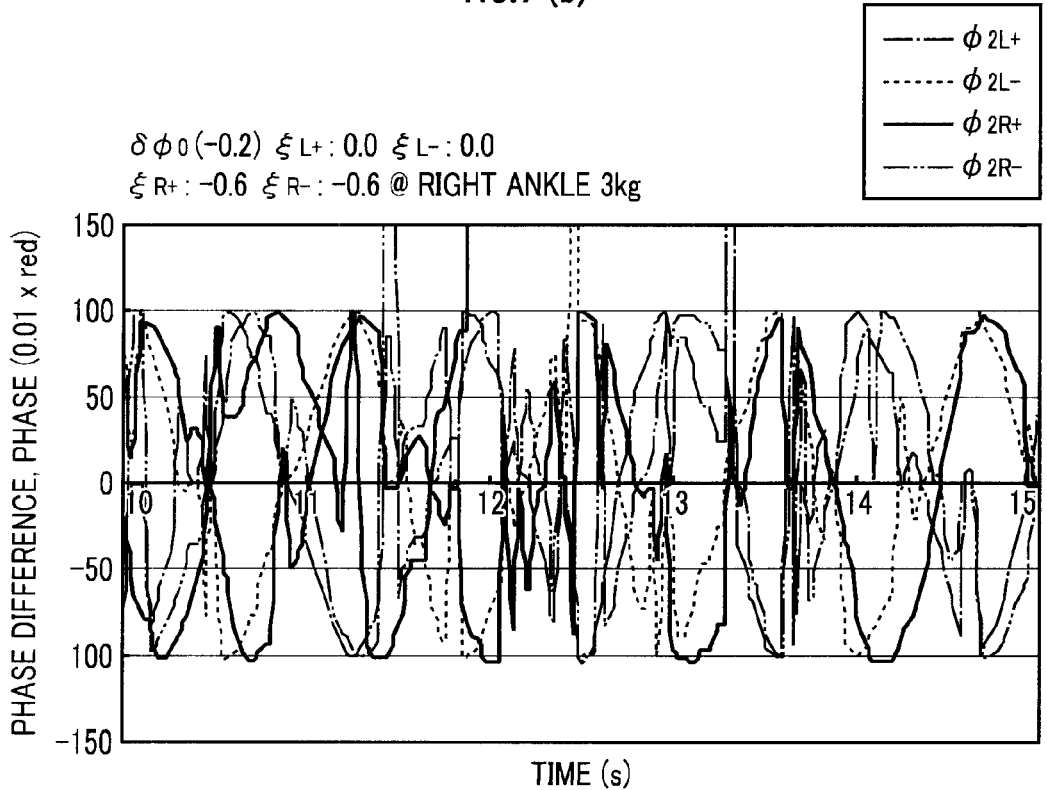
Figure 10:
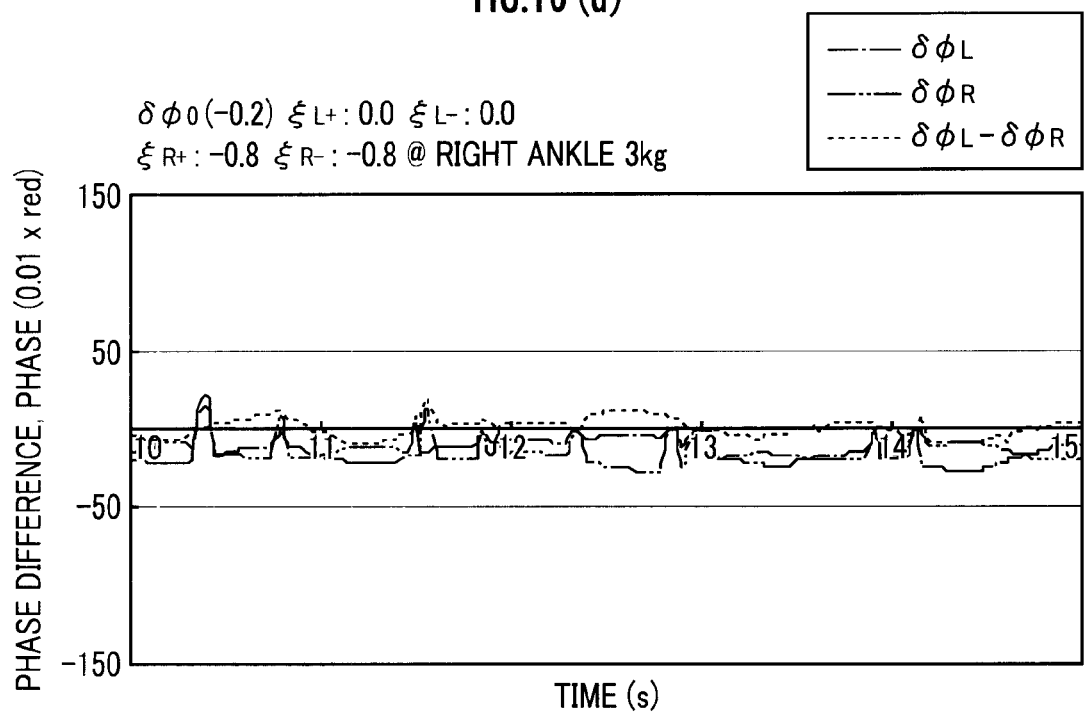
FIG. 10(a) and FIG. 10(b) are diagrams illustrating the results of a fourth performance experiment with the walking assist device.
Figure 10:
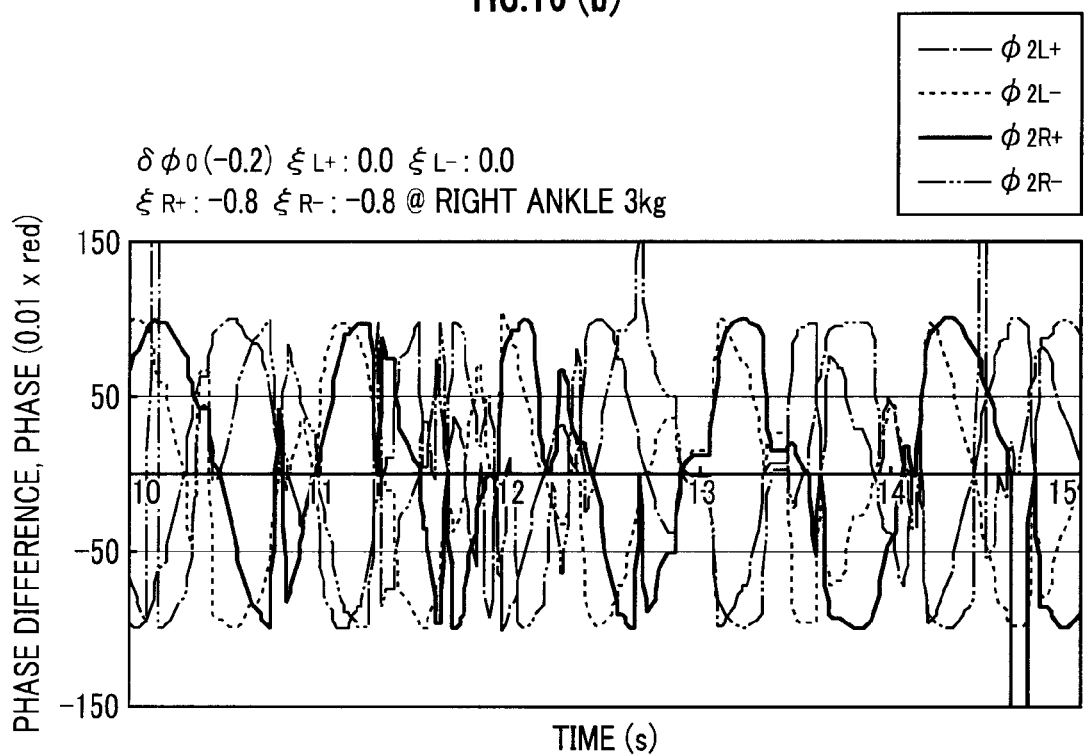
Figure 11:
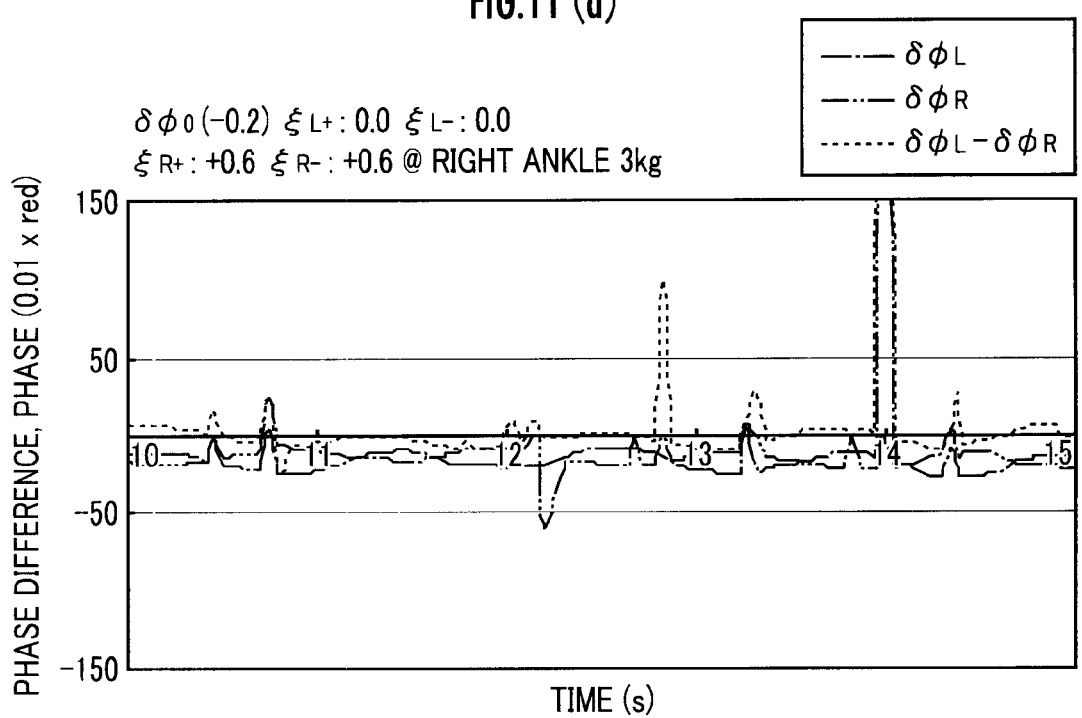
FIG. 11(a) and FIG. 11(b) are diagrams illustrating the results of a fifth performance experiment with the walking assist device.
Figure 11:
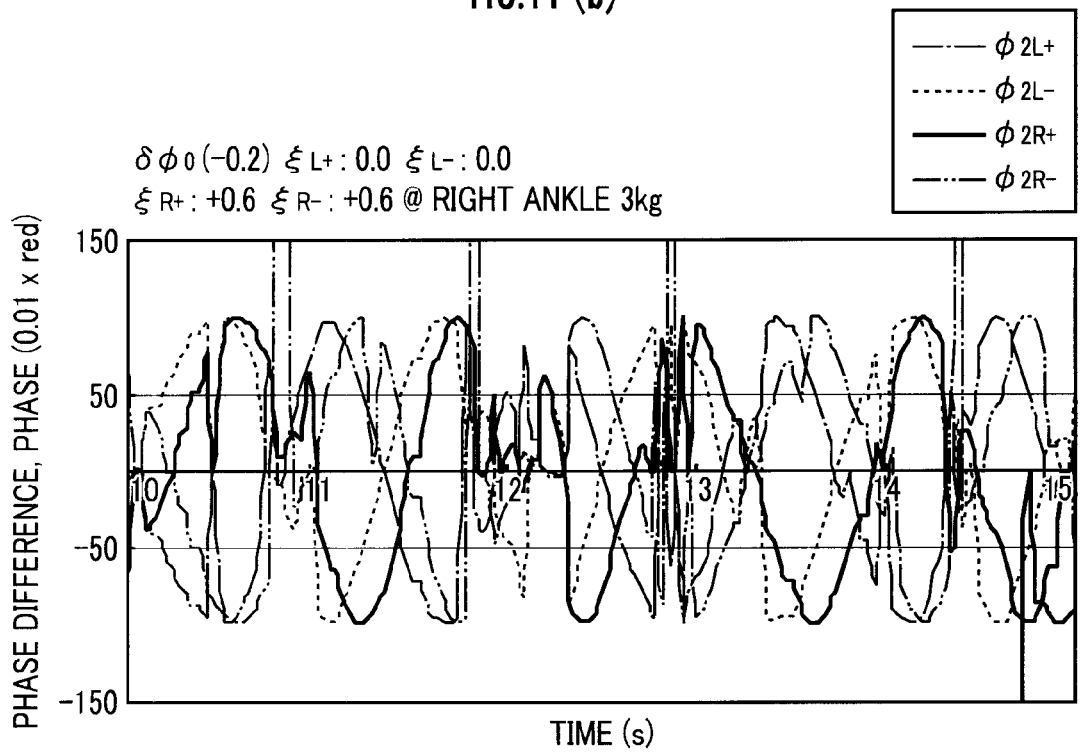
Figure 12:
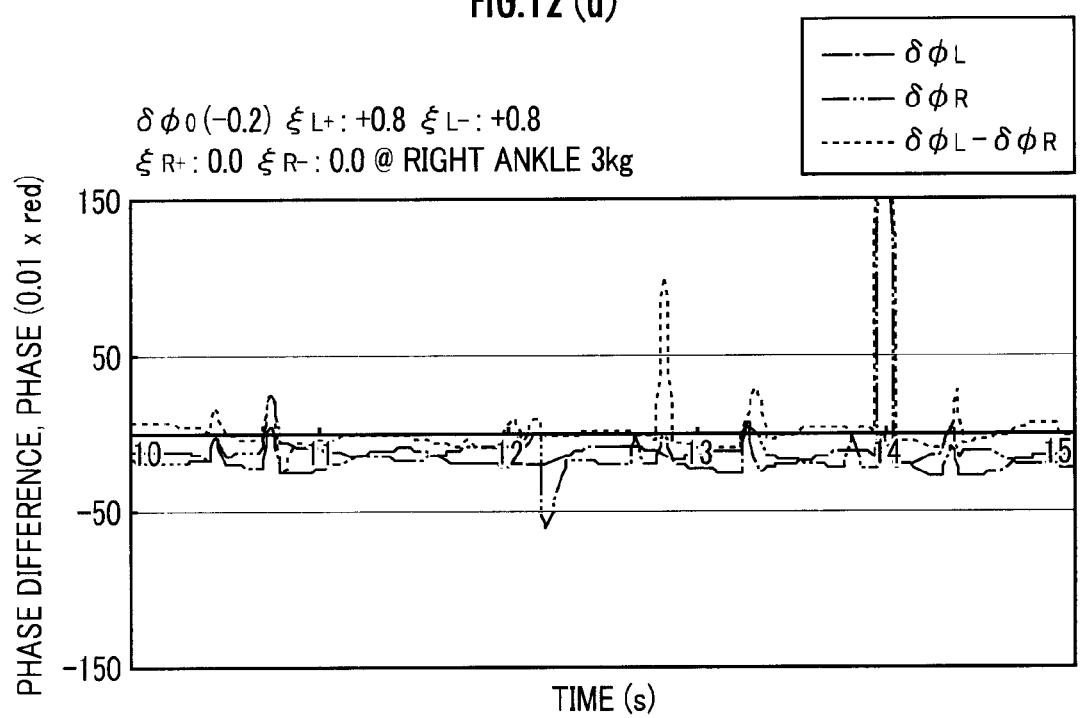
FIG. 12(a) and FIG. 12(b) are diagrams illustrating the results of a sixth performance experiment with the walking assist device.
Figure 12:
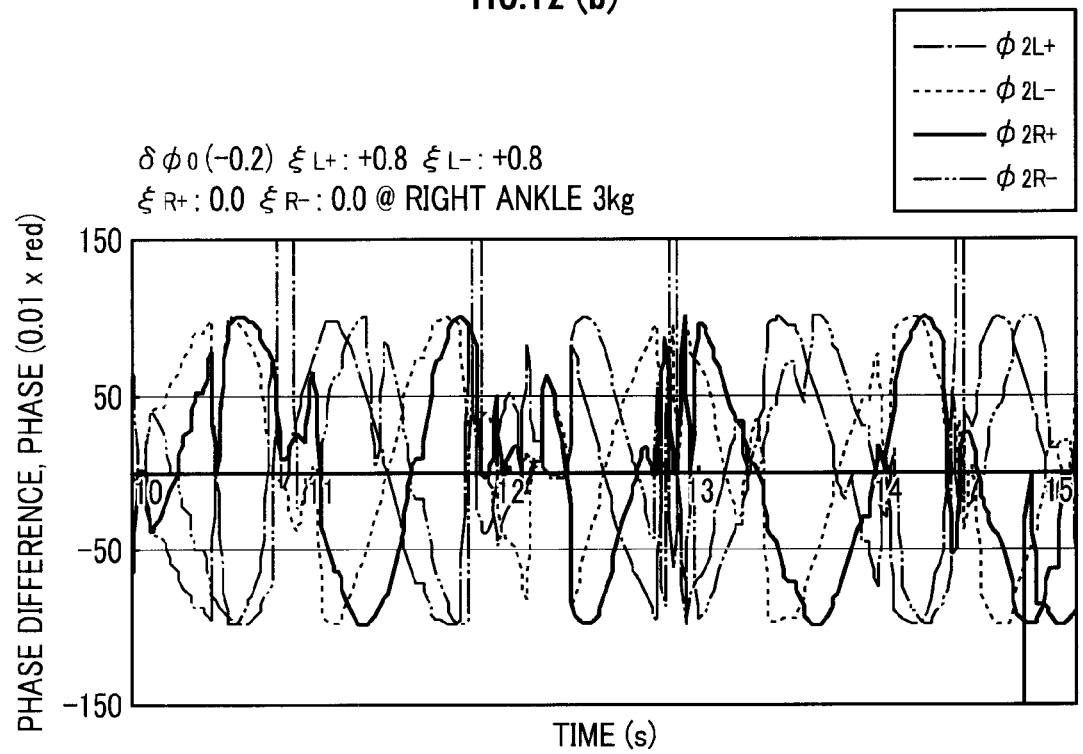
Figure 13:
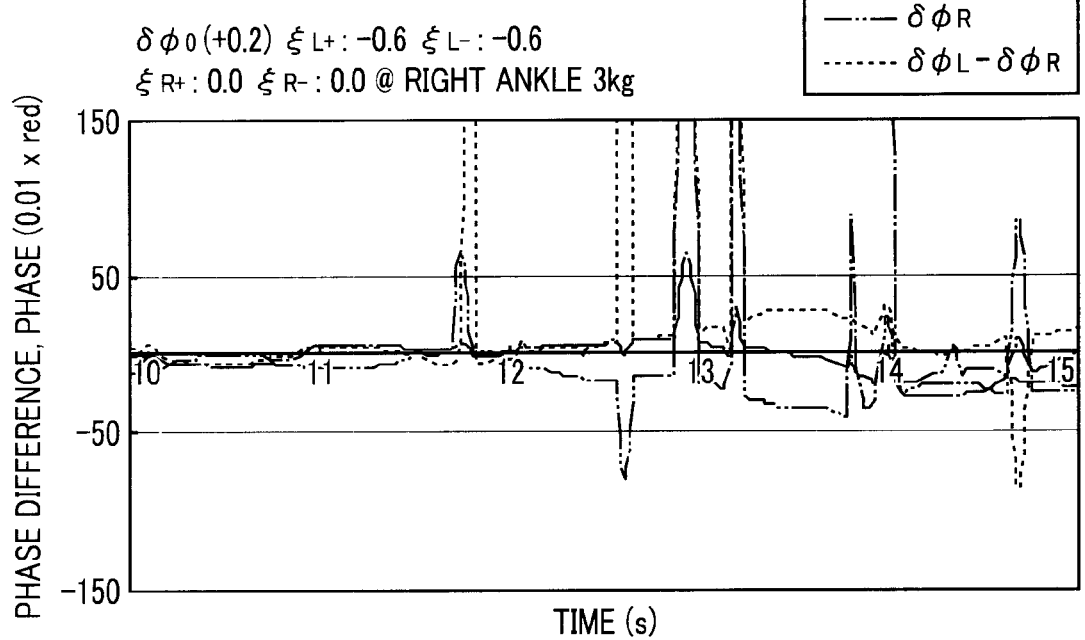
FIG. 13(a) and FIG. 13(b) are diagrams illustrating the results of a seventh performance experiment with the walking assist device.
Figure 13:
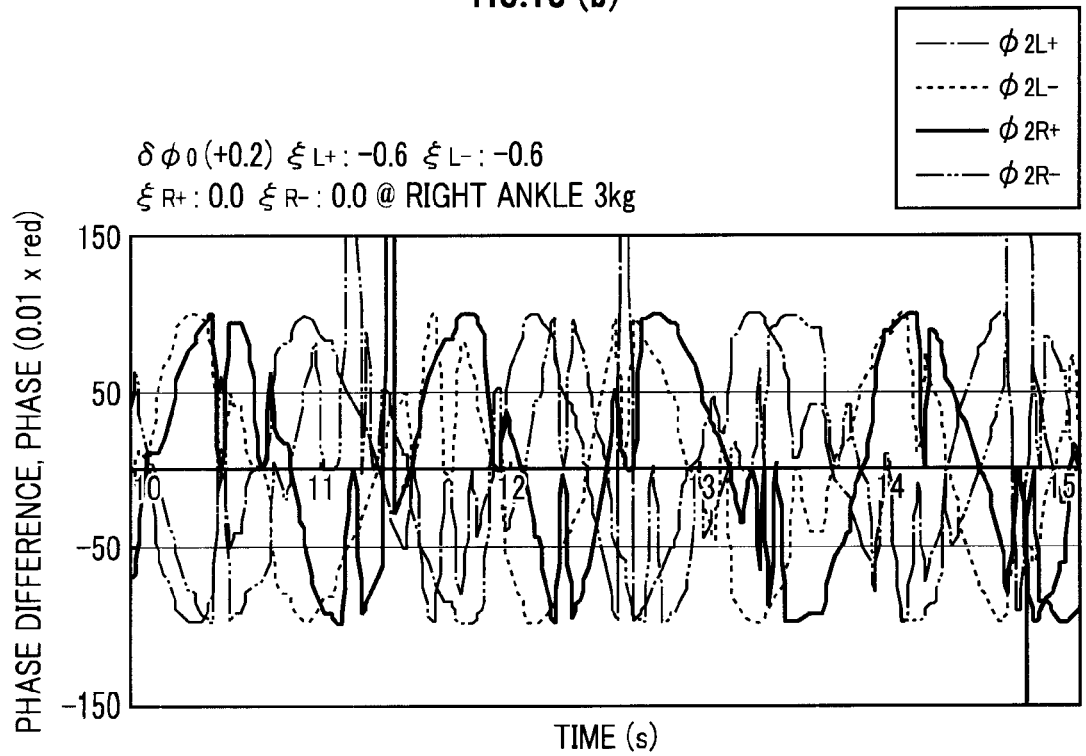
Figure 14:
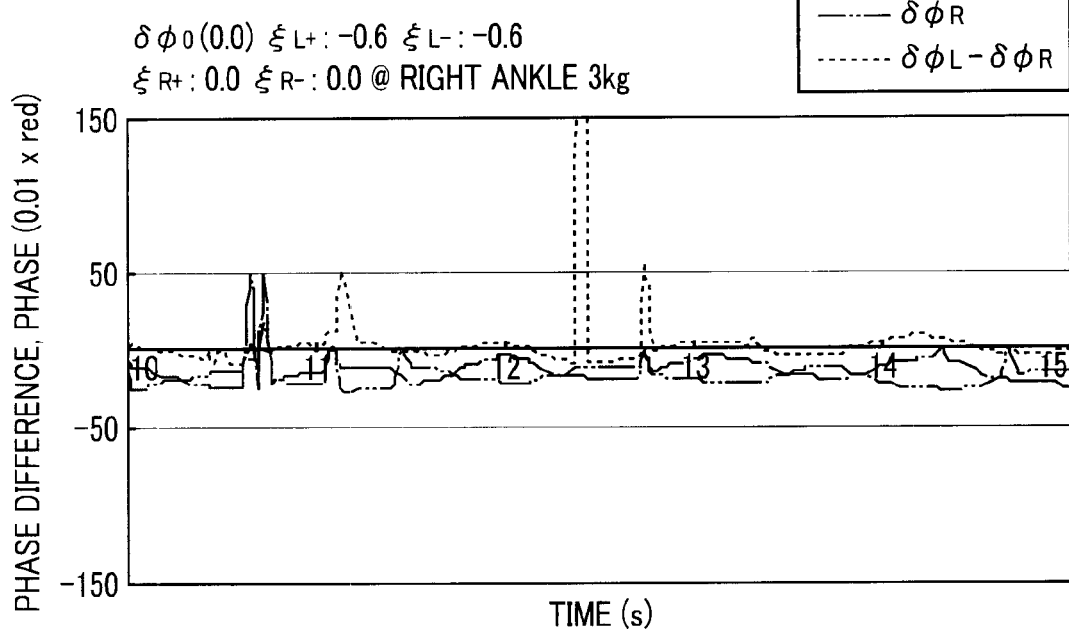
FIG. 14(a) and FIG. 14(b) are diagrams illustrating the results of an eighth performance experiment with the walking assist device.
Figure 14:
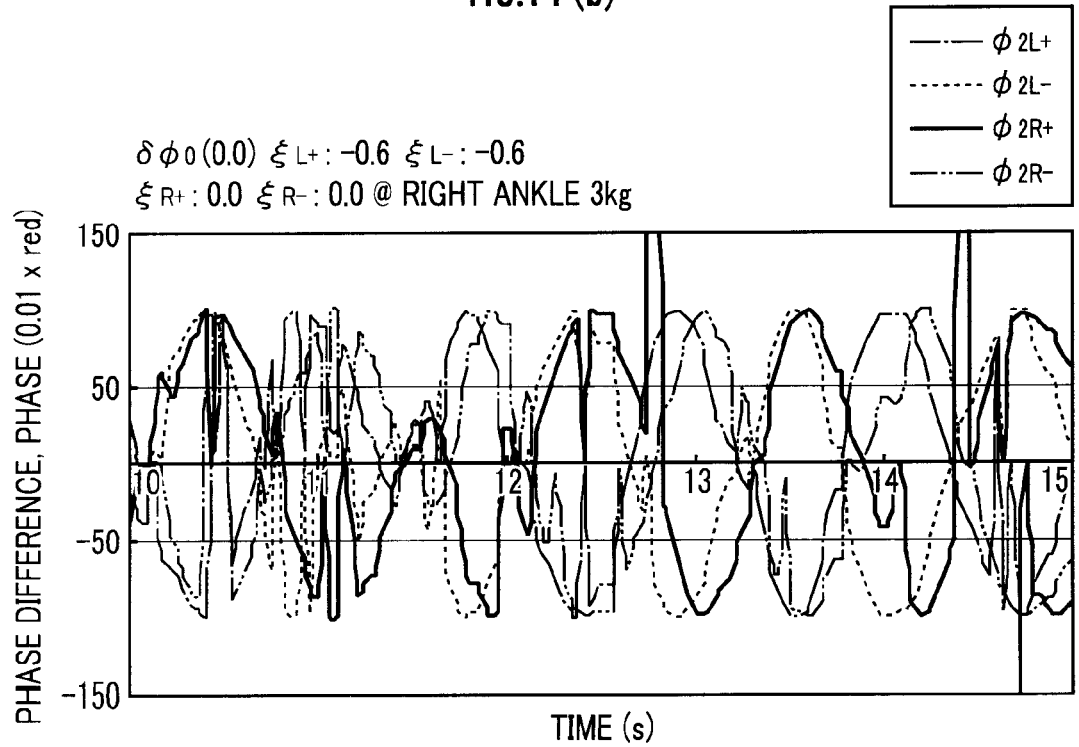

The above experiment results indicate that the left component of the phase difference $\delta\phi_L$ (indicated by the one-dot chain line) and the right component of the phase difference $\delta\phi_R$ (indicated by the two-dot chain line) in the cases illustrated in FIG. 8 and FIG. 10 are stably controlled to agree with the desired phase difference $\delta\phi_0$, as compared with other cases. More specifically, it is seen that the operation of the right actuator 16R is controlled such that the bending start point of time and the stretching start point of time of the right leg, to which the 3-kg weight has been attached to the ankle thereof, are different from those in the case illustrated in FIG. 7, thereby controlling the operations of the actuators 16 such that the motions of the right and left second attachments 12 relative to the first attachment 11 are coordinated with the motions of the right and left thighs relative to the torso of the subject in a desired manner.

(Another Embodiment of the Present Invention)

Alternatively, the value of an output waveform signal at each time obtained by supplying a waveform signal, which indicates the temporal change form of a first phase oscillator $\phi_1$, to a model that outputs an output waveform signal as the solution of an equation, such as the Van der Pol equation may be used for the phase in place of the first phase oscillator $\phi_1$ for at least one of the calculation of a second phase oscillator $\phi_2$ (STEP02 in FIG. 3) and the setting of an intrinsic angular velocity $\omega$ (STEP03 in FIG. 3).

The output waveform signal in this case is defined by the aforesaid equation and exhibits mutual pull-in with an input waveform signal.

What is claimed is:

1. A walking assist device, comprising:
   a first attachment adapted to be installed to an upper body of a human being;
   a pair of second attachments adapted to be installed, one to a right leg and the other to a left leg of the human being;
   a pair of actuators;
   a pair of joint angle sensors configured to output signals based on the right and left hip joint angles, respectively, of the human being; and
   a controller configured to control an operation of each of the pair of actuators on the basis of at least output signals of the pair of joint angle sensors,
   wherein each of the pair of the second attachments is moved with respect to the first attachment by operating each of the pair of actuators thereby to assist relative periodic motions of the right and left legs with respect to the upper body, and
   the controller comprises:
   a first phase oscillator output element configured to measure a phase of a period motion of each thigh relative to the upper body of the human being as each of right and left components of a first phase oscillator on the basis of an output of each of the pair of joint angle sensors;

a second phase oscillator output element configured to calculate, as a second phase oscillator, a phase having right and left components that change at velocities based on a difference relative to the right and left components of the first phase oscillator and right and left components of an intrinsic angular velocity;

an intrinsic angular velocity setting element configured to set the right and left components of a current intrinsic angular velocity by correcting the right and left components of a previous intrinsic angular velocity by an amount based on a previous difference between each of the right and left components of the first phase oscillator and each of the right and left components of the second phase oscillator such that the previous difference approaches a desired difference; and a control signal generating element configured to generate a control signal that changes the phase of the periodic operation of each of the pair of actuators according to a change in each of the right and left components of the second phase oscillator, wherein the control signal generating element is configured to generate a control signal that defines an operational amplitude of each of the pair of actuators on the basis of a ratio of a desired stride length to a length of a leg of the human being according to an increasing function that uses the ratio as a variable thereof.

2. The walking assist device according to claim 1, wherein the second phase oscillator output element is configured to calculate a first component, which is not distinguished according to whether each leg is bending or stretching, as each of the right and left components of the second phase oscillator used to set the intrinsic angular velocity by the intrinsic angular velocity setting element and each of the right and left components of the second phase oscillator used to generate the control signal by the control signal generating element.

3. The walking assist device according to claim 2, wherein the second phase oscillator output element is configured to solve a simultaneous differential equation, which includes a term of correlation between each of the right and left components of the second phase oscillator as the first component and each of the right and left components of the first phase oscillator and a correlation term of each of the right and left components of the second phase oscillator as the first component thereby to calculate the first component.

4. The walking assist device according to claim 1, wherein the second phase oscillator output element is configured to calculate a first component that is not distinguished according to whether each leg is bending or stretching as each of the right and left components of the second phase oscillator used to set the intrinsic angular velocity by the intrinsic angular velocity setting element and to calculate a second component that is distinguished according to whether each leg is bending or stretching as each of the right and left components of the second phase oscillator used to generate the control signal by the control signal generating element.

5. The walking assist device according to claim 4, wherein the second phase oscillator output element is configured to solve a simultaneous differential equation, which includes a term of correlation between each of the right and left components of the second phase oscillator as the first component and each of the right and left components of the first phase oscillator and a correlation term of each of the right and left components of the second phase oscillator as the first component thereby to calculate the first component, and to solve the differential equation of each component corresponding to the second component, which includes a term of correlation between each of a left bending component and a left stretching component of the second phase oscillator as the second component and a left component of the first phase oscillator, or a term of correlation between a right bending component and a right stretching component of the second phase oscillator as the second component and a right component of the first phase oscillator, thereby calculating the second component.

6. A walking assist device, comprising:

a first attachment adapted to be installed to an upper body of a human being;

a pair of second attachments adapted to be installed, one to a right leg and the other to a left leg of the human being;

a pair of actuators;

a pair of joint angle sensors configured to output signals based on the right and left hip joint angles, respectively, of the human being; and a controller configured to control an operation of each of the pair of actuators on the basis of at least output signals of the pair of joint angle sensors, wherein each of the pair of the second attachments is moved with respect to the first attachment by operating each of the pair of actuators thereby to assist relative periodic motions of the right and left legs with respect to the upper body, and the controller comprises:

a first phase oscillator output element configured to measure a phase of a period motion of each thigh relative to the upper body of the human being as each of right and left components of a first phase oscillator on the basis of an output of each of the pair of joint angle sensors;

a second phase oscillator output element configured to calculate, as a second phase oscillator, a phase having right and left components that change at velocities based on a difference relative to the right and left components of the first phase oscillator and right and left components of an intrinsic angular velocity;

an intrinsic angular velocity setting element configured to set the right and left components of a current intrinsic angular velocity by correcting the right and left components of a previous intrinsic angular velocity by an amount based on a previous difference between each of the right and left components of the first phase oscillator and each of the right and left components of the second phase oscillator such that the previous difference approaches a desired difference; and a control signal generating element configured to generate a control signal that changes the phase of the periodic operation of each of the pair of actuators according to a change in each of the right and left components of the second phase oscillator, wherein the control signal generating element is configured to calculate a mean stride length over a plurality of past cycles of the human being on the basis of a length of a leg of the human being and a waveform signal that indicates a temporal change of each hip joint angle obtained from the pair of joint angle sensors and then generate a control signal that defines an operational amplitude of each of the pair of actuators such that a difference between the mean stride length and a desired stride length of the human being decreases.

7. The walking assist device according to claim 6,
wherein the second phase oscillator output element is configured to calculate a first component, which is not distinguished according to whether each leg is bending or stretching, as each of the right and left components of the second phase oscillator used to set the intrinsic angular velocity by the intrinsic angular velocity setting element and each of the right and left components of the second phase oscillator used to generate the control signal by the control signal generating element.

8. The walking assist device according to claim 7,
wherein the second phase oscillator output element is configured to solve a simultaneous differential equation, which includes a term of correlation between each of the right and left components of the second phase oscillator as the first component and each of the right and left components of the first phase oscillator and a correlation term of each of the right and left components of the second phase oscillator as the first component thereby to calculate the first component.

9. The walking assist device according to claim 6,
wherein the second phase oscillator output element is configured to calculate a first component that is not distinguished according to whether each leg is bending or stretching as each of the right and left components of the second phase oscillator used to set the intrinsic angular velocity by the intrinsic angular velocity setting element and to calculate a second component that is distinguished according to whether each leg is bending or stretching as each of the right and left components of the second phase oscillator used to generate the control signal by the control signal generating element.

10. The walking assist device according to claim 9,
wherein the second phase oscillator output element is configured to solve a simultaneous differential equation, which includes a term of correlation between each of the right and left components of the second phase oscillator as the first component and each of the right and left components of the first phase oscillator and a correlation term of each of the right and left components of the second phase oscillator as the first component thereby to calculate the first component, and
to solve the differential equation of each component corresponding to the second component, which includes a term of correlation between each of a left bending component and a left stretching component of the second phase oscillator as the second component and a left component of the first phase oscillator, or a term of correlation between a right bending component and a right stretching component of the second phase oscillator as the second component and a right component of the first phase oscillator, thereby calculating the second component.

11. A walking assist device, comprising:
a first attachment adapted to be installed to an upper body of a human being;
a pair of second attachments adapted to be installed, one to a right leg and the other to a left leg of the human being;
a pair of actuators;
a pair of joint angle sensors configured to output signals based on the right and left hip joint angles, respectively, of the human being; and
a controller configured to control an operation of each of the pair of actuators on the basis of at least output signals of the pair of joint angle sensors,
wherein each of the pair of the second attachments is moved with respect to the first attachment by operating each of the pair of actuators thereby to assist relative periodic motions of the right and left legs with respect to the upper body, and
the controller comprises:
a first phase oscillator output element configured to measure a phase of a period motion of each thigh relative to the upper body of the human being as each of right and left components of a first phase oscillator on the basis of an output of each of the pair of joint angle sensors;
a second phase oscillator output element configured to calculate, as a second phase oscillator, a phase having right and left components that change at velocities based on a difference relative to the right and left components of the first phase oscillator and right and left components of an intrinsic angular velocity;
an intrinsic angular velocity setting element configured to set the right and left components of a current intrinsic angular velocity by correcting the right and left components of a previous intrinsic angular velocity by an amount based on a previous difference between each of the right and left components of the first phase oscillator and each of the right and left components of the second phase oscillator such that the previous difference approaches a desired difference; and
a control signal generating element configured to generate a control signal that changes the phase of the periodic operation of each of the pair of actuators according to a change in each of the right and left components of the second phase oscillator,
wherein the first phase oscillator output element is configured to measure, on the basis of an output of each of the pair of joint angle sensors, an arctangent function of a ratio of each hip joint angular velocity with respect to each hip joint angle as each of the right and left components of the first phase oscillator.

12. The walking assist device according to claim 11,
wherein the second phase oscillator output element is configured to calculate a first component, which is not distinguished according to whether each leg is bending or stretching, as each of the right and left components of the second phase oscillator used to set the intrinsic angular velocity by the intrinsic angular velocity setting element and each of the right and left components of the second phase oscillator used to generate the control signal by the control signal generating element.

13. The walking assist device according to claim 12,
wherein the second phase oscillator output element is configured to solve a simultaneous differential equation, which includes a term of correlation between each of the right and left components of the second phase oscillator as the first component and each of the right and left components of the first phase oscillator and a correlation term of each of the right and left components of the second phase oscillator as the first component thereby to calculate the first component.

14. The walking assist device according to claim 11,
wherein the second phase oscillator output element is configured to calculate a first component that is not distinguished according to whether each leg is bending or stretching as each of the right and left components of the second phase oscillator used to set the intrinsic angular velocity by the intrinsic angular velocity setting element and to calculate a second component that is distinguished according to whether each leg is bending or stretching as each of the right and left components of the second phase oscillator used to generate the control signal by the control signal generating element.

15. The walking assist device according to claim 14,
wherein the second phase oscillator output element is configured to solve a simultaneous differential equation, which includes a term of correlation between each of the right and left components of the second phase oscillator as the first component and each of the right and left components of the first phase oscillator and a correlation term of each of the right and left components of the second phase oscillator as the first component thereby to calculate the first component, and
to solve the differential equation of each component corresponding to the second component, which includes a term of correlation between each of a left bending component and a left stretching component of the second phase oscillator as the second component and a left component of the first phase oscillator, or a term of correlation between a right bending component and a right stretching component of the second phase oscillator as the second component and a right component of the first phase oscillator, thereby calculating the second component.

* * * * *